United States Patent
Shiota et al.

(10) Patent No.: US 6,674,544 B2
(45) Date of Patent: *Jan. 6, 2004

(54) IMAGE PROCESSING METHOD AND APPARATUS

(75) Inventors: Kazuo Shiota, Kanagawa (JP); Toru Matama, Kanagawa (JP); Hiroshi Yamaguchi, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,032

(22) Filed: Jun. 11, 1997

(65) Prior Publication Data

US 2002/0034336 A1 Mar. 21, 2002

(30) Foreign Application Priority Data

Jun. 12, 1996 (JP) .............................. 8-150673
Jun. 18, 1996 (JP) .............................. 8-156921
Jun. 18, 1996 (JP) .............................. 8-157200

(51) Int. Cl.$^7$ ............................................. G06K 15/00
(52) U.S. Cl. ................... 358/1.9; 358/517; 358/520; 358/3.27
(58) Field of Search .............................. 358/512, 517, 358/520, 527, 532, 537, 447, 474, 1.1–1.9, 1.11–1.18; 382/169, 132, 274

(56) References Cited

U.S. PATENT DOCUMENTS

| | | | |
|---|---|---|---|
| 4,317,179 A | * 2/1982 | Kato et al. | .................. 364/515 |
| 4,473,845 A | * 9/1984 | Davy | .......................... 348/246 |
| 5,012,333 A | * 4/1991 | Lee et al. | ..................... 358/80 |
| 5,294,989 A | * 3/1994 | Moore et al. | ............... 358/242 |
| 5,454,044 A | 9/1995 | Nakajima | ..................... 395/117 |
| 5,461,702 A | * 10/1995 | Inoue | .......................... 395/117 |
| 5,568,270 A | * 10/1996 | Endo | ........................... 358/474 |
| 5,682,443 A | * 10/1997 | Gouch et al. | ............... 358/517 |
| 5,815,291 A | * 9/1998 | Shono et al. | ............... 358/504 |

FOREIGN PATENT DOCUMENTS

| | | |
|---|---|---|
| JP | 3222577 | 10/1991 |
| JP | 6217091 | 8/1994 |
| JP | 6233052 | 8/1994 |
| JP | 6245062 | 9/1994 |
| JP | 9128224 | 5/1997 |
| JP | 9182093 | 7/1997 |
| JP | 9214766 | 8/1997 |

\* cited by examiner

*Primary Examiner*—Gabriel Garcia
*Assistant Examiner*—King Y. Poon
(74) *Attorney, Agent, or Firm*—Birch, Stewart, Kolasch & Birch, LLP

(57) ABSTRACT

This improved image processing method comprises the steps of selecting a low-pass filter having a mask size corresponding to the pixel density of an image to be reproduced from a plurality of types of low-pass filters; creating unsharp image signals representing an unsharp image of the photographic image from digital image signals using the selected low-pass filter; obtaining difference signals by carrying out subtraction between signals relating to pixels which correspond to the digital image signals and the unsharp image signals; and obtaining processed image signals for reproducing visible signals by subjecting the difference signals to predetermined image processing. According to the improved image processing method and the improved image processing apparatus embodying the method, an image having good image quality can be recorded in such a manner that image information which has been photoelectrically read out is subjected to image processing and the dodging is carried out to the image information output for recording. Thus, a properly finished print, in which the dodging effect is sufficiently exhibited and the image having good image quality is reproduced, can be stably obtained.

36 Claims, 17 Drawing Sheets

| D | -◁ | ▷+ |
| C | -◁ | ▷+ |
| M | -◁ | ▷+ |
| Y | -◁ | ▷+ |
| γ | -◁ | ▷+ |
| α light | -◁ | ▷+ |
| α dark | -◁ | ▷+ |

~50

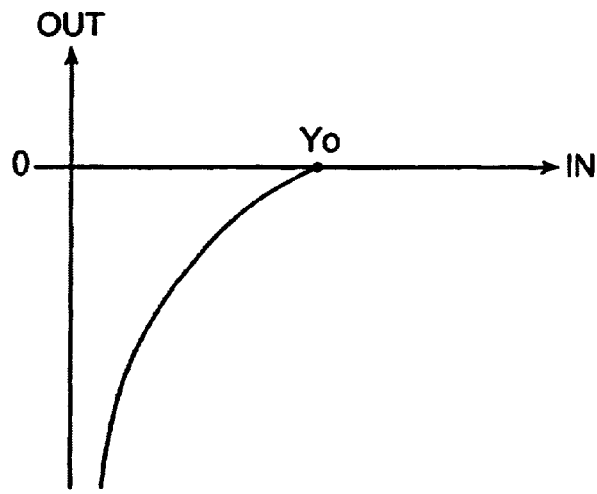
FIG.22a
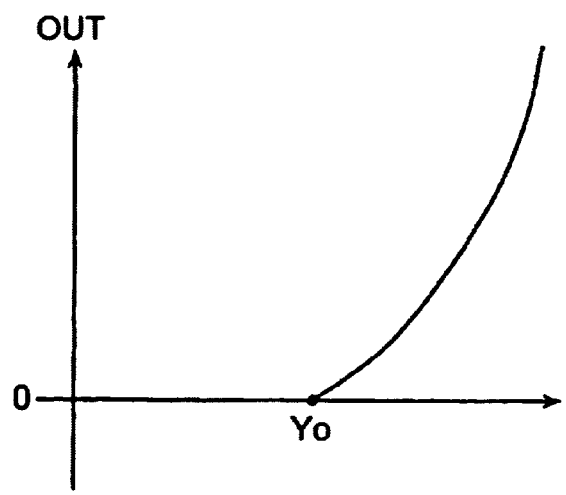
FIG.22b
FIG.23
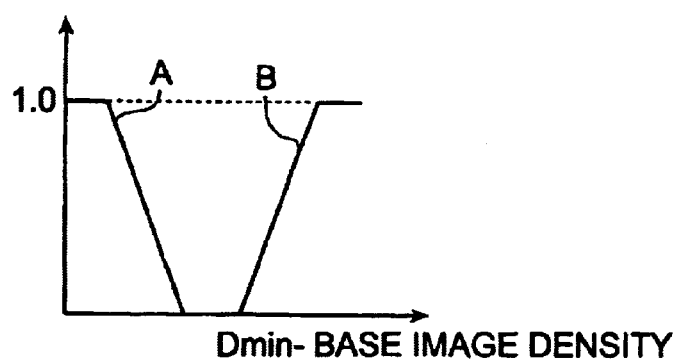

IMAGE PROCESSING METHOD AND APPARATUS

BACKGROUND OF THE INVENTION

1. Field of the Invention

The present invention relates to an image processing method and an image processing apparatus used in an image forming apparatus and the like such as a photograph printer for reproducing a visible image such as a photographic print and the like from a photographic film on which an image of a subject is recorded by a camera, a copy machine and the like for reproducing a visible image such a photographic print and the like from a printed matter etc., and the like, wherein the image processing method and apparatus subject image information photoelectrically read out by an image reading apparatus to image processing so that the read-out image information is converted as image information which permits an image to be recorded at an image recording apparatus. More specifically, the present invention belongs to a technical field of improving an image processing method and an image processing apparatus, in which image processing such as a dodging technique and the like is carried out to remove whitening (a distant view and the like with a high luminance loses contrast and becomes white) and blackening (the face and the like of a backlighted person with a low luminance loses contrast and becomes black) by adjusting a contrast in a reproduced photographic image in a color print and the like.

2. Description of the Related Art

At present, an image recorded on a photographic film such as a negative film, a reversal film and the like (hereinafter, referred to as a film) is printed to a photosensitive material such as photographic paper and the like by so-called direct exposure in which the photosensitive material is subjected to surface exposure by being projected with an image recorded on a film, an image information recorded on a printed matter, or the like.

Recently, research of printers making use of digital exposure, that is, digital photo printers has been carried out. In the digital photo printers, after image information which has been recorded on a film, a printed matter or the like is photoelectrically read out, the read-out image information is converted as digital image information to be recorded by being subjected to various kinds of image processing. Then, a photosensitive material is scanned with and exposed to recording light which has been modulated in accordance with the digital image information to thereby record an image (a latent image) and the recorded image is developed, and thus, the photographic print is obtained.

In the digital photo printers, since a film is photoelectrically read and exposure conditions are determined after a color image density is corrected by signal processing, a period of time during which a single image is exposed is short and the exposure time is fixed to respective values in accordance with an image size. As a result, printing can be promptly carried out as compared with the conventional area exposure.

With the digital photo printers, editing such as combining of a plurality of images, division of an image, and the like, layout of printed images such as editing of characters and images, and various kinds of image processing, such as color/image density adjustment, adjustment of a conversion of magnification, edge enhancement (sharpness enhancement) and the like, can be carried out freely. Therefore, finished prints having been edited and processed freely in accordance with their use can be output. Since the images recorded on finished prints can be stored in a recording medium such as a floppy disk and the like as image information, it is not necessary to prepare a film serving as an original image when additional prints are made. Further, since it is not necessary to determine exposure conditions again, a job can be promptly and simply carried out.

In the prints made by the conventional direct exposure (areal exposure), the images (image density information) recorded on a film or like cannot be perfectly reproduced in some points such as resolution, color/density reproducibility and the like due to the limitation imposed on the reproducible image density range of photosensitive materials. However, with the digital photo printers, prints, on which the images (image density information) recorded on a film or the like are reproduced approximately perfectly, can be obtained.

Basically, the digital photo printers are composed of an image reading apparatus for photoelectrically reading out an image recorded on a document such as a film or the like, an image processing (setup) apparatus for subjecting a read-out image to image processing and determining exposure conditions for recording the image, an image recording apparatus for scanning and exposing an photosensitive material in accordance with the thus determined exposure conditions and developing the image and an image display apparatus such as a monitor or the like for displaying a reproduced print image.

The applicant has invented various image reading apparatuses and image reading methods for realizing the digital photo printer and proposed them in Japanese Unexamined Patent Publications Nos. 6-217091, 6-233052 and 6-245062. Further, the applicant has disclosed the outline of the apparatuses used to the digital photo printer in the above publications.

In the image reading apparatus used in the digital photo printers, reading light produced by a light source impinges upon a film to thereby obtain projected light which carries an image recorded on the film. The image carried by the projected light is read out by subjecting the projected light to photoelectrical conversion. As a result, the image carried by the projected light is formed to an image sensor such as a CCD sensor or the like through an image forming lens. Then, after the thus read image is subjected to various kinds of image processing when necessary, the image is transferred to the image processing apparatus as the image information (image data signals) of the film.

In the image reading apparatus for carrying out reading by, for example, slit scanning, reading light having a slit-like shape extending in a one-dimensional direction is irradiated to a film, and the film is moved in a direction, which is approximately normal to the one-dimensional direction. (Alternatively, the reading light and a photoelectric converting device are moved in the direction, which is approximately normal to the one-dimensional direction.) In this manner, the film is scanned in two-dimensional directions. An image of the light, which has passed through the film and carries the image information on the film, is formed on a light receiving face of the photoelectric converting device, such as a CCD line sensor or the like and read as a light amount data through photoelectrical conversion. The read-out light amount data is amplified and then converted into digital signals through A/D conversion. Thereafter, the digital signals are subjected to various kinds of image processing such as correction for a fluctuation in the characteristics among CCDs, image density conversion, and conversion of magnification, and the processed digital signals which are obtained through the image processing are transferred to the image processing apparatus.

The image processing apparatus sets image processing conditions in accordance with image information having been input and displays an image on a display (an image display apparatus) to which the image information is output. After the operator carries out testing and adjusts the image processing conditions when necessary, the image information is subjected to set image processing and transferred to an image recording apparatus as output image information (exposure conditions) for recording the image.

More specifically, in the image processing apparatus, for example, a visible image is reproduced from the received image signals and displayed on a display apparatus, such as a cathode ray tube (CRT) display apparatus. When necessary, the operator, who views the reproduced image, corrects the gradation, the color, the image density, or the like, of the reproduced image (i.e. sets the setup conditions). In cases where the reproduced image is judged as being acceptable as a finished print, the image information is transferred as image information to be recorded to the image recording apparatus or a monitor.

In the image recording apparatus, when it is, for example, an apparatus making use of a light beam scanning (raster scanning) exposure, three kinds of light beams corresponding to exposure of the layers, which are formed on a photosensitive material and are sensitive to three primary colors e.g., red (R), green (G) and blue (B), are modulated in accordance with the image information transferred from the image processing apparatus and deflected in a main scanning direction (which corresponds to the aforesaid one-dimensional direction). Also, the photosensitive material is conveyed in a sub-scanning direction, which is approximately normal to the main scanning direction (otherwise, the deflected light beams and the photosensitive material are relatively sub-scanned). In this manner, the photosensitive material is two-dimensionally scanned with and exposed to the light beams carrying the image (the image is printed) to thereby form a latent image, that is, the read-out image is recorded on the photosensitive material. Subsequently, the photosensitive material having thus been scanned with and exposed to the light beams is then subjected to development processing in accordance with the exposed photosensitive material. For example, in cases where the photosensitive material is a silver halide photographic material, it is subjected to the development processing comprising the steps of color development, bleach-fix, washing, drying and the like. A finished print (photograph) on which the image recorded on a film is reproduced is thereby obtained.

Incidentally, recording conditions under which an image is recorded on a film are not fixed and there are many cases where a large amount of difference exists between a bright portion and a dark portion (image densities) as found in an image recorded using an electronic flash, a backlighted scene and the like.

The photosensitive material can record an object in a comparatively wide range of luminance. However, since the maximum image density on the photosensitive material is limited, the dynamic range of image density, that is, the dynamic range of exposure which can be reproduced by the photosensitive material is narrower than the dynamic range of luminance of the object and the dynamic range of image density of a film. As a result, when a film image of a scene in which the image of an object has a large difference in luminance is exposed by a conventional method and made to a finished print, there is a tendency that details become imperceptible due to insufficient gradation in either one of a bright (highlight) portion and a dark (shadow) portion on the print. For example, in cases where a picture of a person is recorded against the light, if the picture is exposed and printed such that the image of a person may be preferably clear, the bright portion, such as a sky region, will become white and its details will become imperceptible. Whereas, if the picture is printed such that the bright portion, such as the sky region, may become preferably clear, the image of the person will become black and its details will become imperceptible.

In the conventional printer using the areal exposure, when a photosensitive material is exposed using a film image having a large difference between a bright portion and a dark portion as an original image, there have heretofore been employed a so-called dodging technique, a masking print technique and the like.

In the dodging technique, an ordinary level of exposure is given to a region having an intermediate level of image density in a scene. Also, a long time of exposure is given selectively to a region (for example, the portion of a distant view including distant mountains and the like as the background of a person), which is considered to become white and the details of which are considered to become imperceptible on the print, by using a perforated blocking plate. Further, as for a region (for example, the portion of a backlighted person), which is considered to become black and the details of which are considered to become imperceptible on the print, the exposure time is kept short selectively by using a blocking plate. In this manner, the print is obtained such that the contrast of each subject may be kept appropriate, and the details of the bright portion and the dark portion may be kept perceptible, that is, for example, a distant view and a person can be viewed with appropriate contrast. A method has been proposed, in which an unsharp image film having been photographically formed by the negative-positive reversal of an original image film is used as a blocking plate for locally controlling the exposure time, and in which the printing is carried out by superimposing the original image film and the unsharp image film on one upon the other.

The dodging technique is a method of obtaining a finished print in which a proper image is reproduced over an entire picture in such a manner that an ordinary level of exposure is carried out to a portion having an intermediate image density, an amount of exposure light is increased to a portion where an image tends to become white (a bright portion) and an amount of exposure light is reduced to a portion where an image tends to become black (a dark portion) to thereby correct a very bright portion and a very dark portion of the image recorded on film. Therefore, conventional apparatuses using the surface exposure employs the dodging technique to locally modify an amount of exposure light in accordance with an image recorded on a film. More specifically, the dodging technique uses a method of carrying out exposure by inserting a blocking plate, an ND filter or the like into an exposure light passage, a method of locally changing an amount of light produced by an exposure light source, a method of creating monochrome films by reversing the bright portion and the dark portion of an image recorded on film while making the image unsharp and carrying out exposure by superimposing the films, and the like.

On the other hand, when the dodging technique is intended to be carried out in a digital photo printer, it is very difficult to carry out exposure by inserting a dodging filter or the like into the light passage of a light beam. Thus, it is contemplated to obtain an effect similar to that achieved by dodging in such a manner that an amount of exposure light is increased at a portion where an image tends to become white and an amount of exposure light is reduced at a portion where an image tends to become black by image information processing.

In the digital photo printer, since the operator cannot carry out the dodging by selectively using a filter or the like, it is difficult to predict the effect of the dodging. Therefore, the operator cannot help confirming the effect of dodging from a finished print. As a result, when a dodging function is provided with the digital photo printer, there arises a problem that a finished print in which dodging is improperly carried out may be obtained.

Incidentally, when it is desired to obtain approximately the same degree of a dodging effect to images having a different resolution (a different size) which have been recorded from the same subject, the same degree of unsharpness must be given to the subject.

However, in the aforesaid dodging technique, since operation is carried out using an unsharp image having a fixed mask size which is prepared regardless of a size of an image to be reproduced, the same subject has a different degree of unsharpness when an image is printed in a different size or displayed on a monitor of different size and when an image has a different image density. That is, since a face of the same subject, for example, has a different degree of unsharpness, there is a problem that the effect of dodging is different depending upon a size and the dodging cannot be properly carried out at all times. In particular, there is a serious problem that when a dodging parameter is tested using an image displayed on a monitor, the image displayed on the monitor does not coincide with a print image.

Incidentally, the digital photo printer can adjust the quality of a finished print in a relatively wide range not only by the dodging technique but also by the image information processing.

As a result, it has been desired to realize an image processing method and apparatus capable of realizing a digital photo printer which can achieve the above dodging effect as well as stably obtain a finished print in which an image having good image quality is reproduced.

SUMMARY OF THE INVENTION

In view of the above circumstances, a first object of the present invention is to provide an image processing method and an image processing apparatus capable of obtaining a similar dodging effect at all times even if a reproduced image has a different size.

A second object of the present invention is to provide an image processing method and apparatus embodying the method which are capable of stably obtaining a properly finished print having good image quality with the sufficient effect of the dodging technique. The image processing method and apparatus, which are used in the aforesaid digital photo printer and the like, subject photoelectrically read out image information to image processing to thereby prepare image information for recording an image. The image processing method and apparatus are such that an image having good image quality can be recorded regardless of a state of a film as an original image by carrying out a dodging technique (image information processing for obtaining an effect similar to that obtained the dodging technique using direct exposure) as well as the operator can create a print while confirming a dodging effect.

A third object of the present invention is to provide an image processing method and apparatus embodying the method capable of reproducing an image having good image quality and stably obtaining a properly finished print regardless of a state of film as original image. The image processing method and apparatus, which are used in the aforesaid digital photo printer and the like, subject photoelectrically read out image information to image processing to thereby prepare image information for recording an image. The image processing method and the image processing apparatus discriminate states of an image recorded on a film such as over-exposure/under-exposure, backlight, photographing carried out using an electronic flash, and the like and carry out proper image information processing such as the dodging and the like.

To achieve the above first object, a first embodiment of the present invention provides an image processing method, wherein a visible image is reproduced from digital image data representing a photographic image. The method comprises the steps of:

i) preparing a plurality of kinds of low-pass filters for creating an unsharp image having a different mask size from the digital image data;

ii) selecting a low-pass filter having a mask size corresponding to the pixel density of an image to be reproduced from the plurality of types of the low-pass filters;

iii) creating unsharp image signals representing the unsharp image of the photographic image using the selected low-pass filter;

iv) obtaining difference signals by carrying out subtraction between signals relating to pixels which correspond to the digital image data and the unsharp image signals; and v) obtaining processed image signals for reproducing visible signals by subjecting the difference signals to predetermined image processing.

It is preferable here to select a low-pass filter from the plurality of kinds of the low-pass filter having a different mask size which is suitable depending upon the size of a print to be reproduced or depending upon the size of the print to be reproduced and whether an image to be reproduced is used for the display on a monitor or not.

To achieve the above second object, a second embodiment of the present invention provides an image processing apparatus, wherein a visible image is reproduced from digital image data representing a photographic image, the image processing apparatus comprises:

i) a plurality of kinds of low-pass filters for creating an unsharp image having a different mask size from the digital image data;

ii) low-pass filter selection means for selecting a low-pass filter having a mask size corresponding to the pixel density of an image to be reproduced from the plurality of types of the low-pass filters;

iii) unsharp image signal creation means for creating unsharp image signals representing the unsharp image of the photographic image using the selected low-pass filter;

iv) subtraction means for obtaining difference signals by carrying out subtraction between signals relating to pixels which correspond to the digital image data and the unsharp image signals; and v) image processing means for obtaining processed image signals for reproducing visible signals by subjecting the difference signals to predetermined image processing.

It is preferable here to select a low-pass filter which is suitable depending upon the size of a print to be reproduced or depending upon the size of the print to be reproduced and whether an image to be reproduced is an image used for the display on a monitor or not.

The selection of a low-pass filter having a mask size in accordance with the pixel density of an image to be reproduced means to select a low-pass filter in accordance with a "print size" to be reproduced. The terms "in accordance with the print size" also means to select a low-pass filter depending upon whether an image to be reproduced is used for the display on a monitor or recorded on a print because not only a print but also an image displayed on the monitor have always a fixed size in a system using the same apparatus.

As a specific method of creating unsharp image signals, it is preferable to create the unsharp image signals in such a manner that digital pixel signals are converted into luminance signals and filtered. Further, the unsharp image signals may be created by photoelectrically reading out a projected image which is obtained by making the color image photoelectrically unsharp.

In the arrangement in which prescanning is carried out to previously measure resulting color signals, the unsharp image signals may created in such a manner that pixel data is thinned out at predetermined intervals in the prescanning to thereby create the unsharp signals of the thinned-out signals and the intervals at which the unsharp signals are thinned out are interpolated.

BRIEF DESCRIPTION OF THE DRAWINGS

FIG. 5 explains how processing is carried out by the image processing apparatus shown in FIG. 1, wherein

FIG. 14 shows a table set to the second LUT of the image processing apparatus shown in FIG. 13, wherein

FIG. 22(a) and FIG. 22(b) show examples of a basic table for creating the dynamic range expansion table of the image processing apparatus shown in FIG. 13, respectively; and FIG. 23 shows an example of a table for determining a coefficient to be multiplied to the basic table shown in FIG. 22.

DESCRIPTION OF THE PREFERRED EMBODIMENTS

The image processing method and the image processing apparatus of the present invention will be described below in details with reference to preferred embodiments shown in the accompanying drawings.

Figure 1:
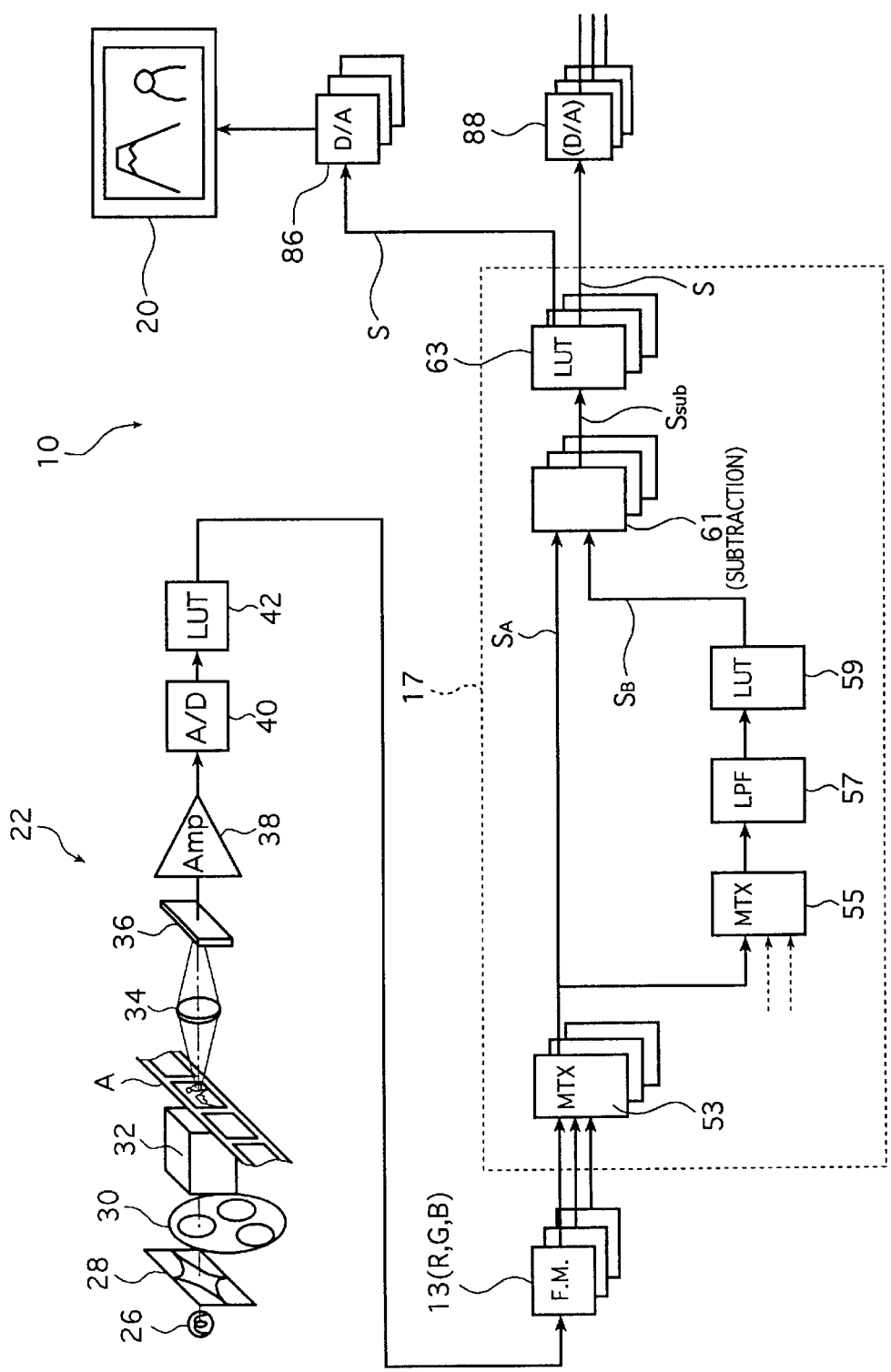
FIG. 1 is a block diagram showing a first embodiment of an image processing apparatus according to the present invention and an embodiment of an image reproducing apparatus including an image reading apparatus for supplying image information to the image processing apparatus.

FIG. 1 shows a schematic view of an embodiment of an image reproducing apparatus to which applied is the image processing apparatus of the present invention embodying the image processing method of the present invention.

An image processing apparatus (hereinafter, referred to as a processing apparatus) 10 processes input image information read out by an image reading apparatus (hereinafter, referred to as a reading apparatus) 22 and outputs the thus processed input image information to an image recording apparatus (hereinafter, referred to as a recording apparatus) 24 shown in FIG. 6 as output image information in accordance with a recorded image. An image reproducing apparatus such as, for example, a digital photo printer is composed of the reading apparatus 22, the processing apparatus 10 and the recording apparatus 24.

The reading apparatus 22 for supplying image information to the processing apparatus 10 of the present invention is an apparatus for photoelectrically reading out an image recorded on a film A and includes a light source 26, a variable diaphragm 28, three color filters or R, G and B filters for decomposing the image recorded on the film A to the three primary colors of R (red), G (green) and B (blue), a color filter plate 30 capable of applying an arbitrary color filter to a light passage by rotation, a diffusion box 32 for making reading-out light which impinges upon the film A uniform in the surface direction of the film A, an image forming lens 34, a CCD sensor 36 as an area sensor for reading out a sheet (one frame) of the image recorded on the film A, an amplifier 38, an A/D converter 40, and a first (look-up table (hereinafter, referred to as a LUT)) 42 for subjecting signals to log conversion to thereby arrange them as image density signals.

In the reading apparatus 22 as described above, reading-out light produced by the light source 26 impinges upon the film A after the amount of light of the reading-out light is adjusted by the diaphragm 28, the color thereof is adjusted through the color filter plate 30 and the reading-out light is diffused by the diffusion box 32. When the reading light passes through the film A, a projected light carrying an image recorded on the film A is obtained.

The image of the projected light is formed on the light receiving surface of the CCD sensor 36 by the image forming lens 34 and photoelectrically read out by the CCD sensor 36. Output signals output from the CCD sensor 36 are amplified by the amplifier 38, converted into digital signals by the A/D converter 40, converted into image density signals at the first LUT 42 and transferred to the processing apparatus 10 of the present invention as the image information of the image recorded on the film A.

The reading apparatus 22 reads out the image recorded on the film A three times by sequentially inserting the red, green and blue filters of the color filter plate 30 and decomposes the image to the three primary colors of red, green and blue. Alternatively, a technique for moving relatively a line sensor with respect to the light may be employed as the image reading technique in place of the area type CCD. As another alternative, a technique for spot photometry using a drum scanner or the like may be also employed.

The processing apparatus 10 of the present invention includes frame memories (R, G, B) 13 which respectively store the R, G and B digital image signals (data) having been converted into the image density signals (data) at the reading apparatus 22, a first matrix (hereinafter, referred to as a MTX) 53 for correcting the digital image signals such that they become color signals capable of being reproduced in appropriate colors on a photosensitive material, which will be described later and obtaining signals $S_A$, a second matrix (hereinafter, referred to as a MTX) 55 for converting the signals $S_A$ into luminance signals, a low-pass filter (hereinafter, referred to as a LPF) 57 for converting the luminance signals into unsharp signals, a third LUT 59 for obtaining unsharp image signals $S_B$ by adjusting the contrast of the luminance signals, a subtractor 61 for obtaining difference signals Ssub by subtracting the signals $S_B$ from the signals $S_A$, a fourth LUT 63 for correcting the contrast of the difference signals Ssub, a D/A converter 86 for digital to analog converting signals S whose contrast has been corrected, and a monitor 20 for displaying a corrected image using analog signals subjected to D/A conversion at the D/A converter 86. Note, the contrast-corrected signals S are also transferred to the driver 88 of the recording apparatus 24 and subjected to D/A conversion by a D/A converter included therein, in addition to the D/A converter 86.

The first MTX 53, the second MTX 55, the LPF 57, the third LUT 59, the subtraction unit 61 and the fourth LUT 63 surrounded by the broken line in FIG. 1 constitute an image processing section 15 for carrying out dodging.

Figure 2:
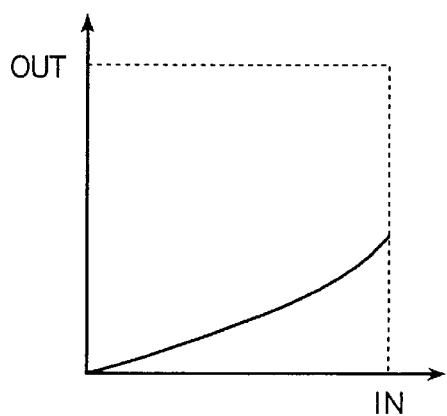
FIG. 2 is a graph showing an example of the γ characteristics of a third look-up table (LUT) 59 of the image processing apparatus shown in FIG. 1.
Figure 3:
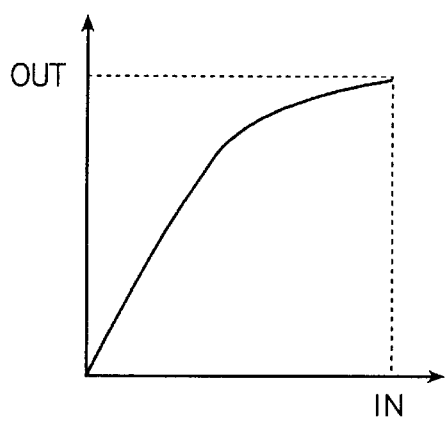
FIG. 3 is a graph showing an example of the γ characteristics of a fourth look-up table (LUT) 63 of the image processing apparatus shown in FIG. 1.

The third LUT 59 stores table data for providing a gradation curve as shown in FIG. 2 and the gradation curve has γ characteristics for making the gradation curve nonlinear so that an increase in an input signal value causes an output signal value to be made somewhat larger. The fourth LUT 63 stores table data for providing a gradation curve as shown in FIG. 3 and the gradation curve has γ characteristics to make the gradation curve nonlinear so that an increase in an input signal value causes an output signal value to be made smaller. As to the contrast of image signals resulting from a series of image processing carried out by the third LUT 59 and the fourth LUT 63, the large area contrast of an entire picture is determined by a value, 1−(γ of third LUT 59) and a local contrast of the picture is determined by a value, (1−(γ of third LUT 59))×(γ of fourth LUT 63). It suffices only to change γ of the third LUT 59 in accordance with the large area contrast of the entire picture (for example, the difference between the brightness of a background and that of a main subject in a backlight scene). However, it has been found as a result of experiment to various scenes carried out by the applicant that the local contrast is preferably set to an approximately fixed value regardless of the contrast of the entire picture. Therefore, it is preferable to set the value (1−(γ of third LUT 59))×(γ of fourth LUT 63) approximately constant by causing the fourth LUT 63 to associate with the third LUT 59. Therefore, in the embodiment, the value (1−(γ of third LUT 59))×(γ of fourth LUT 63) is set to an approximately fixed value by assuming that the third LUT 59 has the γ characteristics shown in FIG. 2 and the fourth LUT 63 has the γ characteristics shown in FIG. 3.

The MTX 53 corrects the detected digital image signals such that they may become the color signals capable of being reproduced in appropriate colors on the photosensitive material. Specifically, the MTX 53 corrects the detected digital image signals such that they may be reproduced in appropriate colors by the combination of the spectral characteristics of the film A and the spectral characteristics of the photosensitive material, on which the visible image is reproduced ultimately. The MTX 55 converts the R, G and B color image signals into luminance signals. Specifically, the MTX 55 converts the R, G and B color image signals into the luminance signals by using a value of one-third of the mean value of each color image signal or by using the YIQ base, or the like.

Figure 4:
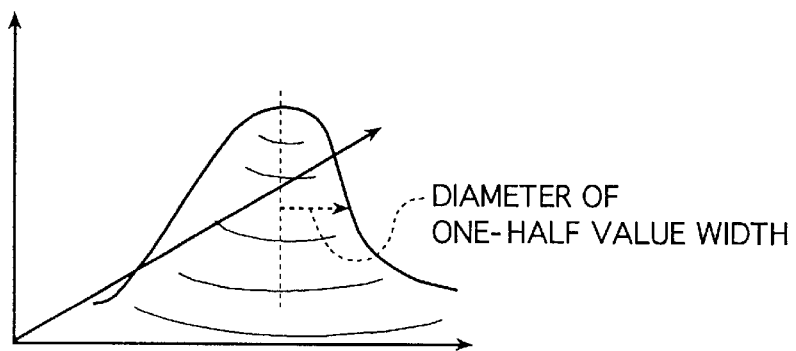
FIG. 4 is a view showing a low-pass filter of the image processing apparatus shown in FIG. 1.

The LPF 57 is an unsharp mask filter for making the image signals two-dimensionally unsharp and has characteristics as shown in FIG. 4. When the unsharp mask filter has an excessively small diameter, sharpness is unnaturally emphasized or the overshoot of an edge portion becomes remarkable. Whereas, there is caused a defect that the effect of the unsharp mask cannot be so much obtained when a main subject is small, and the size of an apparatus is increased by the increase of an amount of calculation. As a result of the experiment carried out by the applicant as to the various scenes, it is preferable that the diameter of the one-half value width of a mask size is about 0.3 to 3 mm (more preferably, about 0.5 to 2 mm) in a case of a 135 film. When a film has a size larger than the 135 film, it is preferable that the unsharp mask has a larger size.

The degree of saturation of the image signals obtained from the series of image processing is determined by the following formula.

$$(\text{MTX } 53) \times (1 - (\gamma \text{ of LUT } 59) \times (\text{MTX } 55) \times (\gamma \text{ of LUT } 63)$$

Therefore, color reproducibility can be freely controlled by properly determining the coefficients of the MTXs and the LUTs in the above formula. Further, the arrangement of the MTX 55 as a matrix for converting color signals into luminance signals permits the unsharp mask to act while maintaining the color reproducibility of the edge portion of the subject as well as permits a circuit for carrying out the above calculation to be arranged simply.

When the values or the value of the MTX 53 and/or the MTX 55 are changed in association with each other so as to approximately fix the value of the above formula, the color reproducibility of a print can be fixed when the value of γ of the LUT 59 is changed to control the degree of the effect of the unsharp mask depending upon an image.

In the present invention, a plurality of types of LPFs 57 having a different mask size are prepared as the LPF 57 and unsharp image signals are created and the dodging is carried out by selecting a low-pass filter having a mask size which corresponds to the pixel density of an image to be reproduced from the plurality of types of the LPFs 57.

Figure 7:
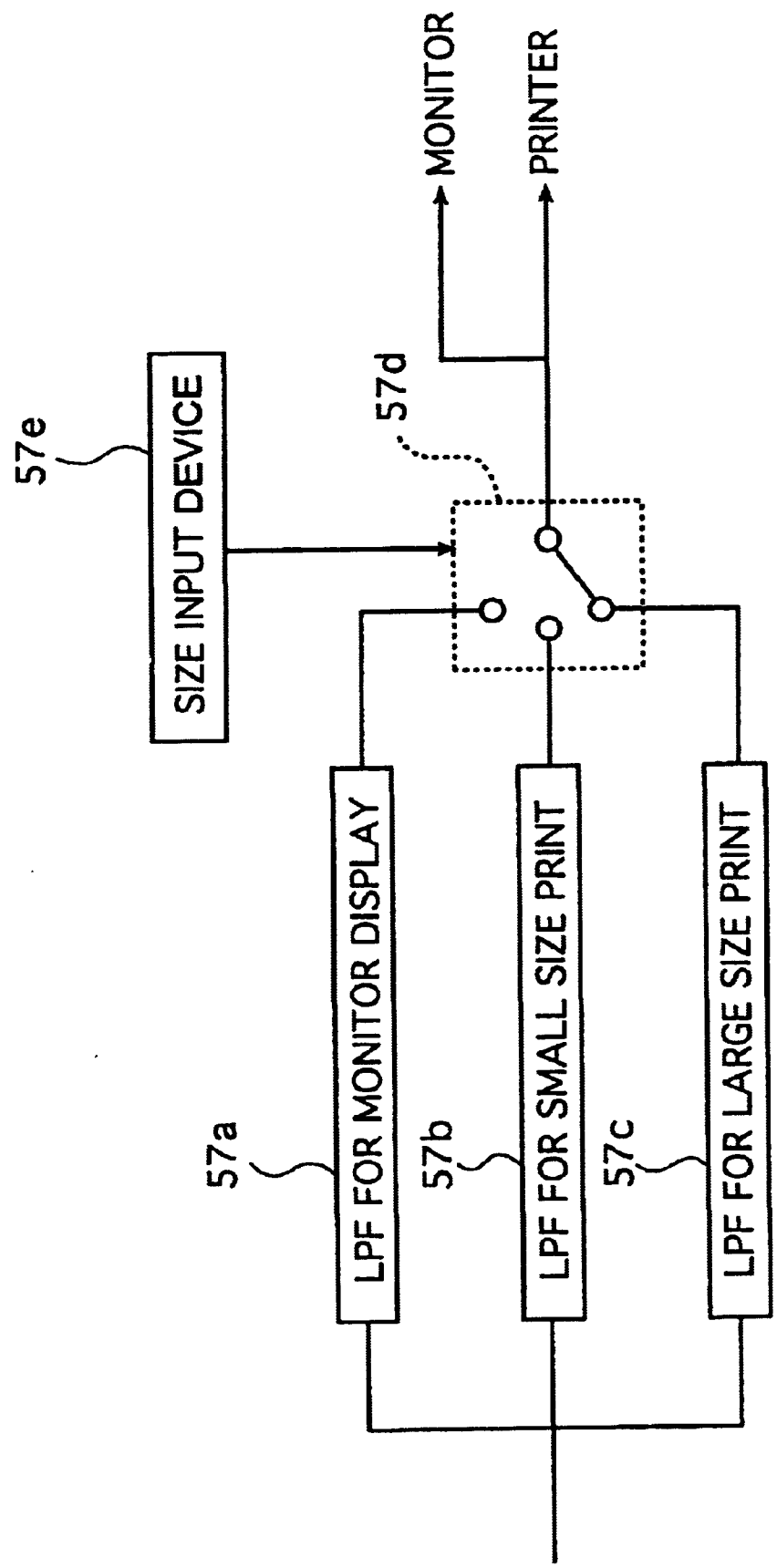
FIG. 7 is a block diagram showing the arrangement of a low-pass filter for creating an unsharp mask in the first embodiment of the image processing apparatus shown in FIG. 1.

FIG. 7 shows an example of the arrangement in which the plurality of types of the LPFs 57 having a different mask size are prepared and a proper low-pass filter is selected from them.

In the example of FIG. 7, three low-pass filters, that is, a LPF 57a having a large mask size used to the display on the monitor, a LPF 57b having a small mask size for making a small size print, and a LPF 57c having a large mask size for making a large size print are connected in parallel to each other so that they can be selectively used by being switched by a selector 57d which is actuated by a size input device 57e. The size input device 57e is used to input signals in accordance with the size of an image to be reproduced. The size input device 57e may be connected to an input device for setting a print size to a printer and get signals therefrom or may output signals by detecting the size of a color photographic paper set to the printer. Otherwise, the size input device 57e may receive setting signals for the display on the monitor and select the LPF 57a for the display on the monitor in response to the setting signals. That is, the size input device 57e may be any arbitrary one so long as it inputs to the selector 57d signals for selecting a low-pass filter having a size corresponding to the pixel density of an image to be reproduced.

According to the above embodiment, the selector 57d is switched by the size input device 57e and a low-pass filter, which corresponds to a print size input by the size input means 57e or to the information indicating whether an image is displayed on the monitor or not, is selected from the three low-pass filters, that is, the LPF 57a having a large mask size used to the display on the monitor, the LPF 57b having a small mask size for a small size print, and the LPF 57c having a large mask size for a large size print. With this arrangement, an unsharp mask having a mask size suitable to the pixel density of an image to be reproduced is set, unsharp image signals are created and an image having been subjected to the dodging suitable to the size of the reproducing image can be reproduced.

Figure 5A:
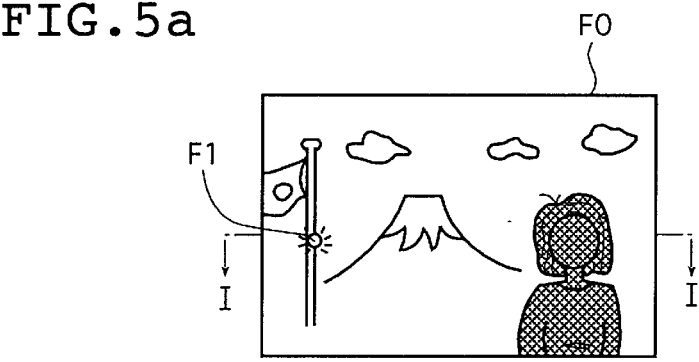
FIG. 5(a) is a view showing an original image.

Next, how the above embodiment operates will be described with reference to FIG. 1 and FIG. 5. First, light is produced by the light source 26 of the image reading apparatus 22 and made to the light having a predetermine amount of light at the light regulating variable diaphragm 28. The amount of light is set such that an amount of light which has passed through the lowest image density point of an image recorded on the film A and been measured previously is slightly lower than the saturated level of the CCD sensor 36. The light passes through the color filter plate 30, is diffused by the diffusion box 32 and irradiated onto the film A. The light having been modulated in accordance with the image recorded on the film A and passed through the film A is irradiated onto the CCD sensor 36 through the lens 34 and photoelectrically converted into image signals representing the image recorded on the film A. It is assumed in the embodiment that the image is a backlighted image as shown in FIG. 5(a) and a scene including a catch light F1 made by the reflection of the sunlight is recorded on the film A. There are obtained here image signals having three colors which represent a color image by switching the color filter plate 30 to red, green and blue. Since the respective R, G and B signals thus obtained through the photoelectrical conversion carried out by the CCD sensor 36 are weak, they are amplified by the amplifier 38 and then converted into digital image signals by the A/D converter 40. The respective R, G and B digital image signals are converted into image density signals by the first LUT 42 and supplied to the processing apparatus 10 of the present invention. The processing apparatus 10 carries out the following processing. That is, the three image density signals of R, G and B supplied from the reading apparatus 22 are first stored in the frame memories 13 (R, G, B), respectively. Thereafter, the image signals stored in the frame memories 13 (R, G, B) are read out and the colors thereof are corrected at the MTX 53. As described above, the MTX 53 corrects the digital image signals such that they may be reproduced in appropriate colors by the combination of the spectral characteristics of the film A and the spectral characteristics of the photosensitive material on which a visible image is reproduced ultimately. The digital image signals $S_A$ having been subjected to the color correction at the MTX 53 are input to the subtractor 61 which will be described later.

Figure 5B:
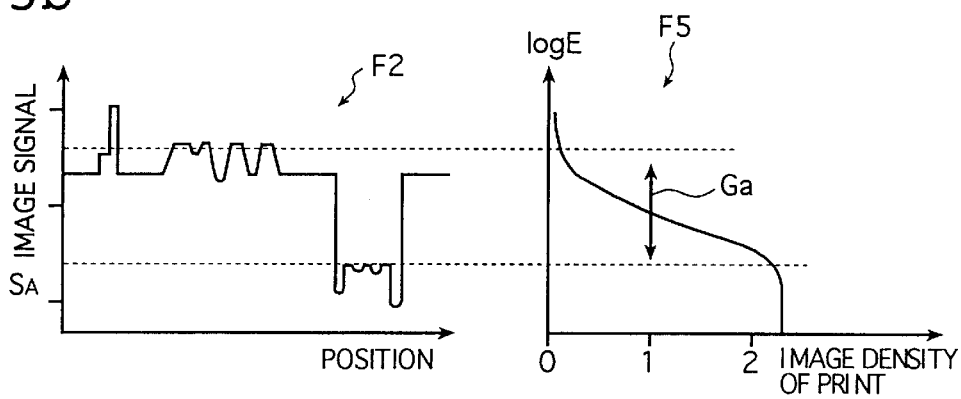
FIG. 5(b) is a graph showing digital image signals SA along the line I—I of FIG. 5(a)

The digital image signals $S_A$ input to the subtractor 61 are arranged as profile signals F2 as shown in the section I—I of the image F0 shown in FIG. 5(b). The digital image signals $S_A$ and a final print image density are related to each other in the manner described below. Specifically, in a gradation curve F5 representing the relationship between a signal value and a print density, the region, in which the subject image pattern can be reproduced such that the details of the subject image pattern may not become imperceptible due to insufficient gradation, is the region Ga shown by the broken lines of FIG. 5(b). In the digital image signals $S_A$, since the portion of the catch light of the image F0 and the portion of the person is located outside of the region Ga, when the signals are printed to the photosensitive material as they are, the portion of the catch light will become white and its details will become imperceptible, whereas the portion of the person will become black and its details will also become imperceptible. Accordingly, the present invention carries out the following processing so that the excessively bright portion and the excessively dark portion can be printed on the photosensitive material without making the details thereof imperceptible.

First, the digital image signals $S_A$ are input to the subtractor 61 as well as they are copied and converted into luminance signals at the MTX 55. As described above, the MTX 55 converts the color image signals into the luminance signals by using a value of one-third of the mean value of each of the RGB color image signals or by using the YIQ base, or the like.

Figure 5C:
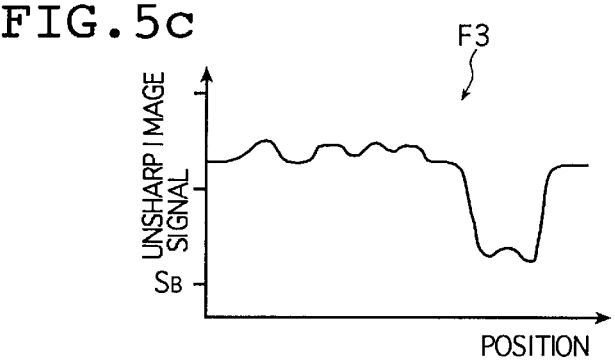
FIG. 5(c) is a graph showing an unsharp image signals $S_B$ and FIG. 5(d) is a graph showing an example of difference signals Ssub.

The thus obtained luminance signals are then converted into unsharp mask signals at the LPF 57. Then, the unsharp image signals are subjected to gradation conversion by the LUT 59 and converted into unsharp image signals $S_B$ as shown in FIG. 5(c). When the digital image signals $S_A$ are compared with the unsharp image signals $S_B$, the portion of the catch light or the portion of the person of the digital image signals $S_A$ becomes unsharp in the unsharp image signals $S_B$. That is, the high frequency component in the digital image signals $S_A$ disappears and they are represented only by a low frequency component.

Figure 5D:
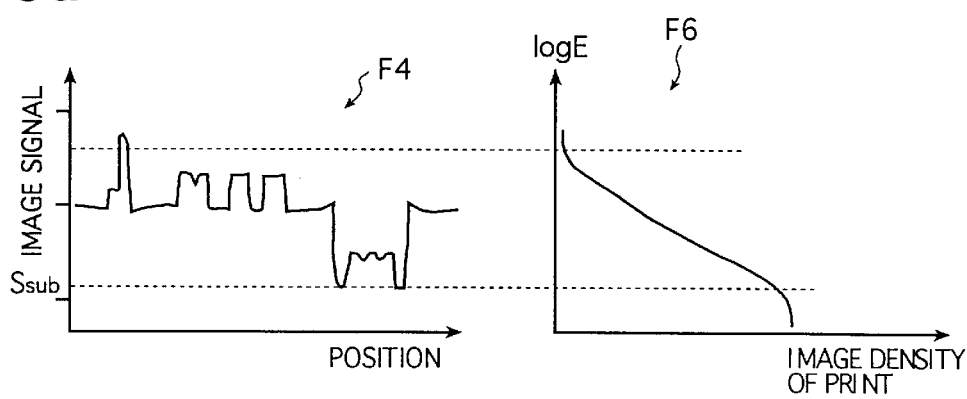

Thereafter, the subtraction of the digital image signals $S_B$ from the digital image signals $S_A$ in the subtractor 61 results in difference signals Ssub as shown in FIG. 5(d). As shown in FIG. 5(d), in the comparison of the difference signals Ssub with the digital image signals $S_A$ shown in FIG. 5(a), the portion of the catch light F1 or the portion of the person of the digital image signals $S_A$ are removed and the range of the signals is located within the region Ga. The thus obtained difference signals Ssub are subjected to gradation conversion, image density conversion and the like at the LUT 63 and then converted into analog signals by being supplied to the D/A converter 86 or the D/A converter in the driver 88 of the recording apparatus 24. The analog signals converted at the D/A converter 86 are supplied to the monitor 20 and reproduced as a visible image by them.

At the recording apparatus 24, a photosensitive material Z is scanned with and exposed to a light beam with a light beam scanning (raster scanning) technique in accordance with the image signals having been processed by an unsharp image and transferred from the processing apparatus 10 of the present invention, that is, in accordance with output image information output for obtaining a finished print. The photosensitive material Z having been exposed is developed and output as a finished print P. As shown in FIG. 6, the recording apparatus 24 includes the driver 88 for driving an acoust-optic modulator (AOM) 94 by subjecting the image processed image signals to D/A conversion, an image-wise exposure section 90 and a development section 92.

The image processed signals (output image information) output from the processing apparatus 10 is transferred to the driver 88 and subjected to D/A conversion.

The AOM driver 88 drives the AOM 94 of the image-wise exposure section 90 such that the light beam is modulated in accordance with the D/A converted image information.

At the image-wise exposure section 90, the photosensitive material Z is scanned with and exposed to light with the light beam scanning technique, and an image represented by the above image information is thereby reproduced on the photosensitive material Z. As conceptually illustrated in FIG. 6, the image-wise exposure section 90 includes a light source 96R for producing a light beam having wavelengths of a narrow-band range corresponding to the exposure of a red-sensitive layer of the photosensitive material Z, a light source 96G for producing a light beam having wavelengths of a narrow-band range corresponding to the exposure of a green-sensitive layer of the photosensitive material Z, and a light source 96B for producing a light beam having wavelengths of a narrow-band range corresponding to the exposure of a blue-sensitive layer of the photosensitive material Z. The image-wise exposure section 90 also includes the AOMs 94R, 94G and 94B for respectively modulating the light beams, which have been produced by the light sources 96R, 96G and 96B, in accordance with the recorded image information. The image-wise exposure section 90 further includes a rotating polygon mirror 98 serving as a light deflector, an fθ lens 100 and sub-scanning conveyance means of the photosensitive material Z.

The light beams produced by the light sources 96R, 96G and 96B and travel along directions at different angles and impinge upon the corresponding AOMs 94R, 94G and 94B. The AOMs 94R, 94G and 94B receive drive signals R, G and B, which are for red, green and blue colors and correspond to the record image information, from the driver 88. The AOMs 94R, 94G and 94B thus modulate the intensities of the light beams, which impinge thereupon, in accordance with the recorded image information.

The light beams having been modulated by the AOMs 94R, 94G and 94B impinge upon the rotating polygon mirror 98 serving as the light deflector at substantially the same point thereof and are reflected therefrom. The light beams are thus deflected in main scanning directions, which are indicated by the double headed arrow x in FIG. 6. Also, when necessary, the image-wise exposure section 90 may be provided with light beam shaping means and an optical system for compensation for inclinations of the surface of the light deflector.

The photosensitive material Z is rolled and loaded at a predetermined position so as to be shielded from light.

The photosensitive material Z is pulled out by pullout rollers (not shown) and sub-scanned and conveyed in a sub-scanning direction (the direction of the arrow y in FIG. 6) which is normal to the a main scanning direction while being held at a scanning position z by a pair of conveyer rollers 102a and 102b which constitute sub-scanning means and are located with the scanning position z intervening therebetween.

Since the light beams are deflected in the main scanning direction, the entire area of the photosensitive material Z, which is being conveyed in the sub-scanning direction, is scanned with the light beams in the two-dimensional directions. In this manner, the image (latent image) of the image information transferred from a fine scan image processing section 18 is formed to the photosensitive material Z.

The photosensitive material Z, which has been exposed to the light beams, is then conveyed by a pair of conveying rollers 104 into the development section 92, the photosensitive material Z is subjected to developing processing, and the finished print P is thereby obtained.

For example, in cases where the photosensitive material Z is a silver halide photosensitive material, the the development section 92 is composed of a color development tank 106, a bleach-fix tank 108, washing tanks 116a, 116b, 116c and 110d, a drying unit, a cutter (not shown) and the like. After the photosensitive material Z is subjected to predetermined processing in the respective tanks and dried, it is cut to a predetermined length corresponding to a single sheet of a print and output as the finished print P.

Figure 6:
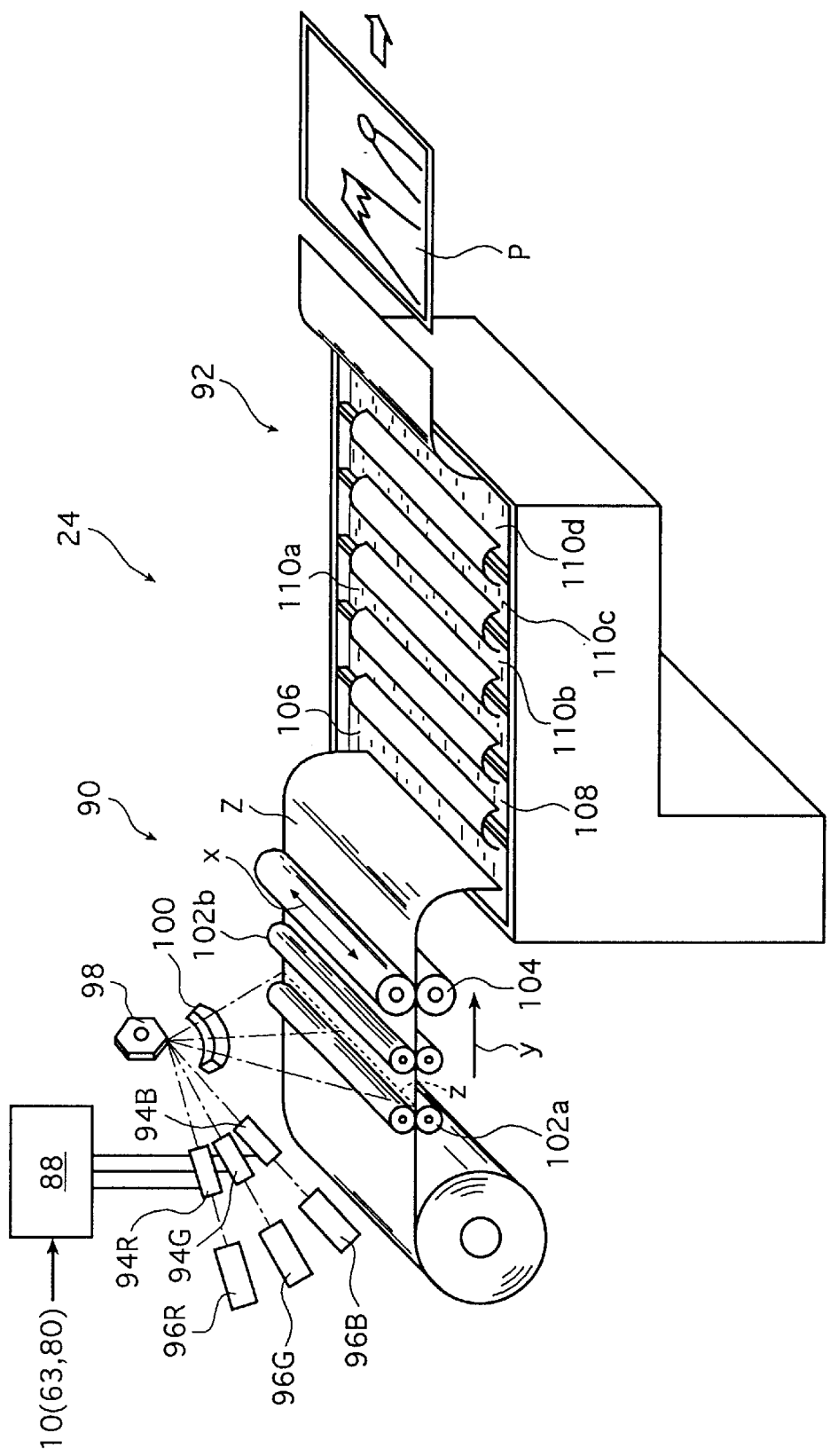
FIG. 6 is a conceptual view of an image recording apparatus to which the image processing apparatus shown in FIG. 1 outputs image information.

In the embodiment shown in FIG. 6, as the light sources 96R, 96G, 96B, various types of light beam sources may be utilized, which are capable of producing the light beams having predetermined wavelengths corresponding to the sensitive layers of the photosensitive material Z. For example, various types of semiconductor lasers, SHG lasers, or gas lasers, such as He-Ne lasers, may be used. Alternatively, the light sources may be constituted as a light beam combining optical system.

In lieu of the rotating polygon mirror, a resonant scanner, a galvanometer mirror, or the like may be utilized as the light deflector. When necessary, the image-wise exposure section 90 may be provided with light beam shaping means and an optical system for compensation for inclinations of the surface of the light deflector.

In the embodiment of FIG. 6, the light beams are modulated by the AOMs 94R, 94G and 94B. Alternatively, in cases where light sources, such as LDs, which are capable of undergoing direct modulation, are utilized, the light beams may be directly modulated in accordance with the recorded image information. Also, in lieu of the two pairs of rollers, which are located with the scanning position intervening therebetween, a combination of an exposure drum, which supports the photosensitive material at the scanning position, and two nip rollers, which are located with the scanning position intervening therebetween, may be utilized as the sub-scanning conveyance means.

Further, in lieu of the light beam scanning described above, a drum scanner may be employed. In cases where the drum scanner is employed, the photosensitive material is wound around a drum, and the light beams are caused to impinge on a single point on the photosensitive material. Also, the drum is rotated and, at the same time, is moved along the axis of the drum. As another alternative, a surface exposure operation using a surface light source and a liquid crystal shutter may be employed. As a further alternative, the exposure operation may be carried out by using a linear light source, such as an LED array. Furthermore, in the embodiment of FIG. 6, although the photosensitive material is exposed in the state of the roll and developed and dried by the development section 92 and then cut, it may be cut before it is exposed or before it is developed.

In the manner described above, the visible image is reproduced at the development section 92. Even if the visible image is the one reproduced from the backlight scene shown in FIG. 5(*a*), the details of the pattern of the person will not become imperceptible due to insufficient gradation in the visible image. Also, the details of the bright background pattern will not become imperceptible. Further, even if the visible image is the one reproduced from an image recorded by using an electronic flash, a visible reproduced image can be obtained such that both the details of a pattern of a person, which is located on the foreground side in the image, and the details of a background, which is located far way behind the pattern of the person, may be prevented from becoming imperceptible due to insufficient gradation.

In cases where a dodging technique is carried out by controlling the distribution of the luminance of an illuminating light source, the selection of the factor of the MTX 55 is the only possible method for controlling the color reproducibility. Therefore, in cases where the color reproducibility is adjusted, both the brightness and the color reproducibility change simultaneously at an edge in the image, and a print having an unnatural feeling is obtained. However, in the embodiment of the image reproducing apparatus in accordance with the present invention, the MTX 55 is constituted in order to convert the color image signals into the luminance. Therefore, with the embodiment of the image reproducing apparatus according to the present invention, even though the brightness of an edge of a subject changes, the color reproducibility at the edge does not change. Accordingly, a print having a natural feeling can be obtained. Further, the LUTs 59, 63 have the nonlinear characteristics. Therefore, the gradation correction can be carried out also for the portions of nonlinear characteristics on the original image film (e.g., an over-exposure portion and an under-exposure portion). Furthermore, in cases where processing means for sharpness enhancement is added to the image reproducing apparatus, the high frequency contrast of the image can be enhanced.

It has been confirmed by the experiment carried out by the applicant that almost all the frames can be finished beautifully in image density without the need of altering a type of the LUTs for each frame. That is, even if a scene having an ordinary or weak contrast is processed at the LUT having γ characteristics which are set using a scene having a strong contrast as a reference, since unsharp image signal are made flat as the size of the LPF increases, an unnatural feeling is difficult to be caused. As a result, although there are many cases in the surface exposure system that an exposure time, which is determined from, for example, an average image density, must be greatly corrected with respect to a difference between an average image density and an image density of a main subject to finish the main subject to a proper image density, the method of the present invention can obtain an sufficiently good reproduced image by the slight correction thereof.

Further, since image signals can be processed by reading out an image from the film A only once without the execution of prescanning in the first embodiment of the present invention, the image can be processed at a high speed.

Next, a second embodiment of the image processing apparatus according to the present invention will be described.

Figure 8:
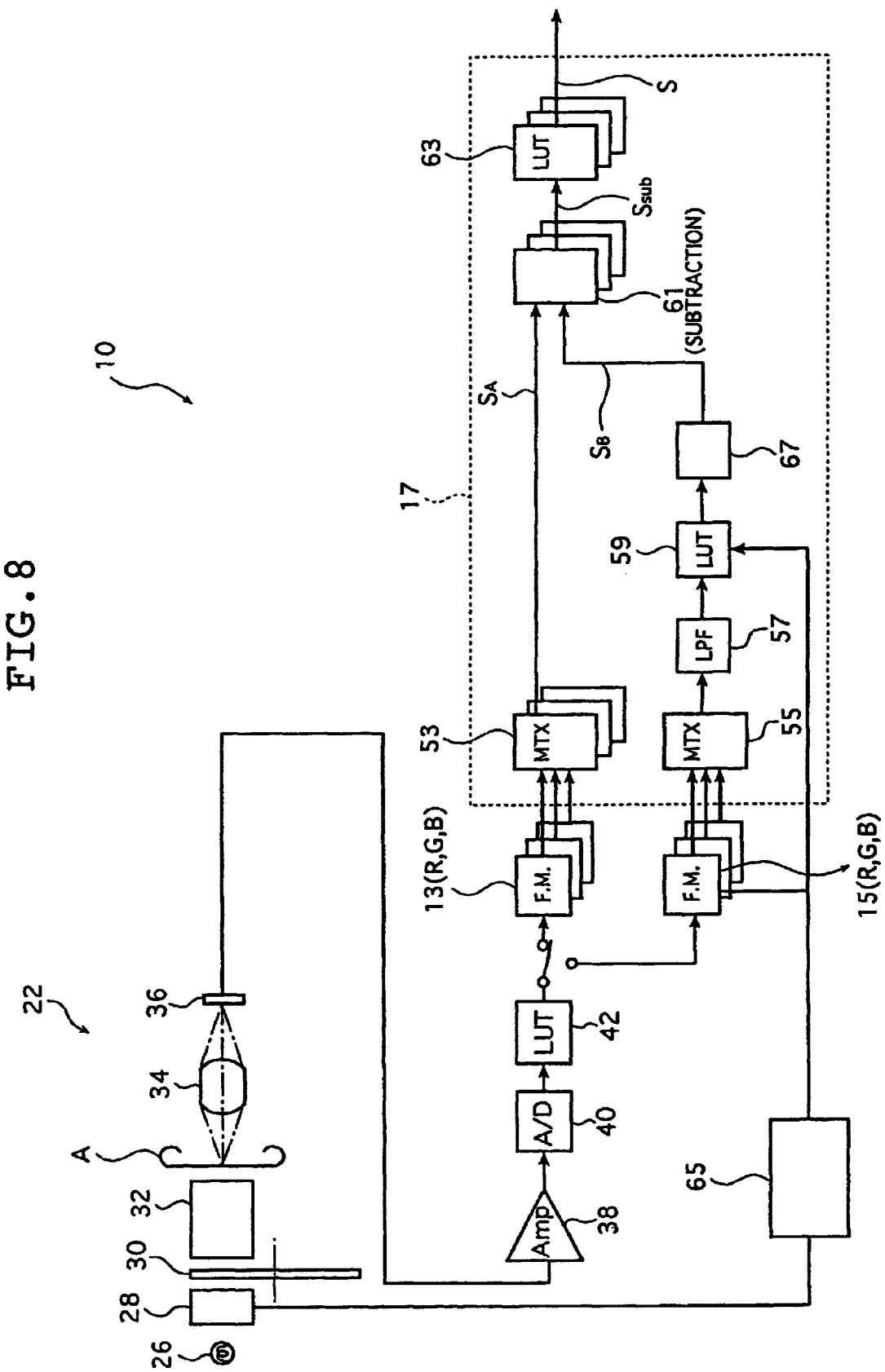
FIG. 8 is a block diagram showing an embodiment of an image reproducing apparatus including a second embodiment of the image processing apparatus according to the present invention.
Figure 9A:
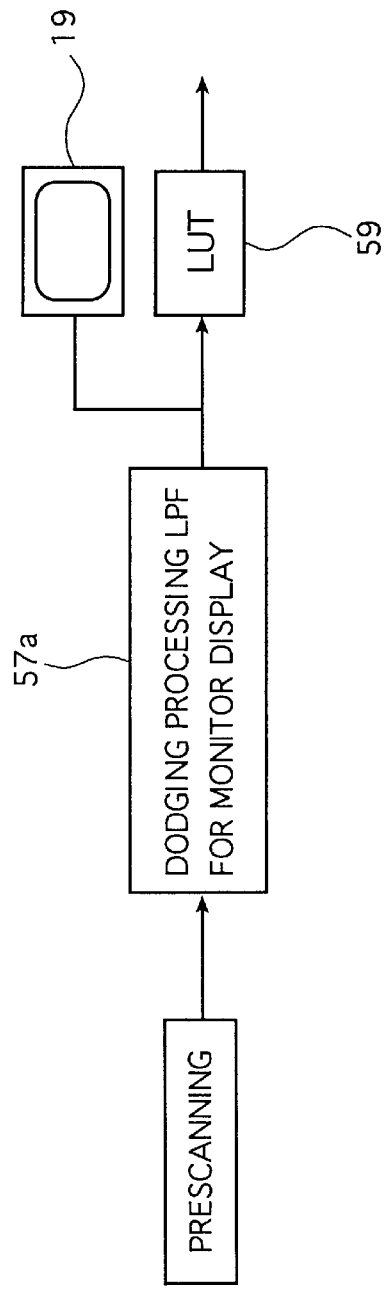
FIGS. 9A and 9B are block diagrams showing the arrangement of a low-pass filter for creating an unsharp mask in the second embodiment of the image processing apparatus shown in FIG. 2.
Figure 9B:
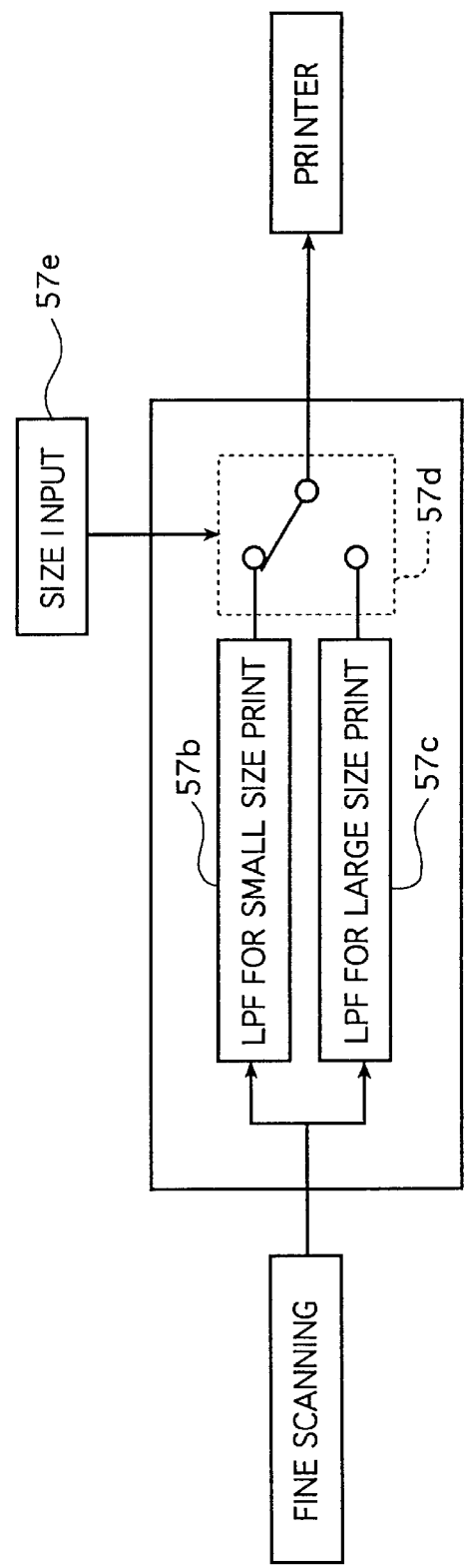

FIG. 8 is a block diagram showing the second embodiment of the image processing apparatus according to the present invention. As shown in FIG. 8, an image reproducing apparatus including an image processing apparatus 10 of the second embodiment of the present invention first carries out prescanning for coarsely reading out an image recorded on a film A every pixels at predetermined intervals by an image reading apparatus 22 and then carries out fine scanning for reading out the image recorded on the film A by narrowing the intervals of the pixels based on the information obtained by the prescanning. The image reproducing apparatus of the second embodiment is different from the image reproducing apparatus including the image processing apparatus 10 according to the first embodiment of the present invention shown in FIG. 1 in that it includes prescanning frame memories 15 (R, G, B) for storing signals obtained by the prescanning, a light regulating controller 65 for regulating a light regulating diaphragm 28 based on the signals obtained by the prescanning and interpolation device 67 for interpolating the signals obtained by the prescanning. As shown in FIG. 9, the second embodiment includes, as an unsharp mask creating LPF 57, a LPF 57*a* for use in the prescanning which has a large mask size for the display on a monitor 19, and two low-pass filters or a LPF 57*b* for use in the fine scanning which has a small mask size to be used when a small size print is made and a LPF 57*c* for use in the fine scanning which has a large mask size to be used when a large size print is made. The LPF 57*b* and the LPF 57*c* are connected in parallel with each other so that they can be selectively used by being switched by a selector 57*d* which is actuated by size input device 57*e*.

The LPF 57*a* having a large mask size for the display on the monitor 19 is used in the prescanning and the output therefrom is input to a LUT 59 and at the same time transferred to the monitor 19.

In the fine scanning, unsharp image signals are created and dodging is carried out by selecting a low-pass filter having a mask size corresponding to the pixel density of an image to be reproduced from the LPF 57*b* having a small mask size to be used when a small size print is made and the LPF 57c having a large mask size to be used when a large size print is made. These two filters are selectively used by being switched by the selector 57d which is actuated by the size input device 57e.

In the second embodiment of the present invention, first, the prescanning is carried out. That is, light is produced by the light source 26 of the image reading apparatus 22 and regulated to the light having a predetermine amount of light by the light regulating diaphragm 28. The light is caused to pass through an RGB filter plate 30 and irradiated onto a film A after it is diffused by a mirror box 32. The light is modulated in accordance with an image recorded on the film A and irradiated onto a CCD sensor 36 through an imaging lens 34. At the time, the CCD sensor 36 photoelectrically detects the irradiated light by using, for example, the pixels thereof alternately without using all of them. Then, three-color prescanning signals which represent a color image can be obtained by switching the RGB filter plate 30 to red, green and blue. After the prescanning signals are amplified by an amplifier 38, they are converted into digital prescanning signals at an A/D converter 40 and further converted into image density signals at a first LUT 42 and transferred to the processing apparatus 10 of the present invention. In the processing apparatus 10 of the present invention, the image density signals with the three colors of red, green and blue transferred from the reading apparatus 22 are stored in the prescanning frame memories 15 (R, G, B), respectively, at first. Thereafter, the light regulating controller 65 reads out the prescanning signals stored in the prescanning frame memories 15 (R, G, B) and the amount of the light produced by the light source 26 is adjusted by regulating the light regulating diaphragm 28 in the fine scanning based on the signal values of the prescanning signals. That is, when the signal values obtained by the prescanning are relatively large, the amount of the light irradiated onto the film A is made relatively small to thereby prevent the image density of the image obtained finally from becoming excessively high, whereas when the signal values obtained by the prescanning are relatively small, the amount of the light irradiated onto the film A is made relatively large to thereby prevent the image density of the image obtained finally from becoming excessively low.

Subsequently to the regulation of the light regulating diaphragm 28 based on the prescanning signals as described above, the fine scanning is carried out. In the fine scanning, first, light is generated by the light source 26 of the image reading apparatus 22 and regulated to the light having a predetermine amount of light by the light regulating diaphragm 28 likewise the prescanning. The predetermined amount of the light is determined by the prescanning signals obtained by the prescanning. The light is caused to pass through the RGB filter plate 30 and irradiated onto the film A after it is diffused by the mirror box 32. The light having been modulated in accordance with the image recorded on the film A and passed through the film A is irradiated onto the CCD sensor 36 through an imaging lens 7 and photoelectrically converted into image signals representing the image recorded on the film A. At the time, the light having passed through the film A is photoelectrically detected using all the pixels of the CCD sensor 36, different from the prescanning. Then, three-color prescanning signals which represent the color image can be obtained by switching the RGB filter plate 30 to red, green and blue. After the image signals obtained at the CCD sensor 36 are amplified at the amplifier 38, they are converted into digital image signals at the A/D converter 40 and further converted into image density signals at the LUT 42 and transferred to the processing apparatus 10 of the present invention. In the processing apparatus 10 of the present invention, the image density signals with the three colors of red, green and blue obtained at the reading apparatus 22 are stored in frame memories 13 (R, G, B) at first, respectively. Thereafter, the digital image signals are read out from the frame memories 13 (R, G, B) and input to subtractor 61 after the colors thereof are corrected at the MTX 53.

The prescanning signals are read out from the frame memories 15 (R, G, B) and converted into luminance signals at a MTX 55. As described above, the MTX 55 converts the color image signals into the luminance signals by using a value of one-third of the mean value of each of the RGB color image signals or by using the YIQ base. The thus obtained luminance signals are then converted into unsharp mask signals by the LPF 57 which are most suitable to the size (pixel density) of a reproduced image. The unsharp image signals are subjected to gradation conversion at the LUT 59. Then, the intervals of the pixels disposed alternately are interpolated by the interpolation device 67 based on the pixel value of an adjacent pixel to thereby obtain unsharp image signals $S_B$. Thereafter, the unsharp image signals $S_B$ are input to subtractor 61.

Likewise the first embodiment, the digital image signals $S_A$ are input to the subtractor 61 as well as copied and then converted into luminance signals by the MTX 55. As described above, the MTX 55 converts the color image signals into the luminance signals by using a value of one-third of the mean value of each of the RGB color image signals or by using the YIQ base, or the like. Next, the thus obtained luminance signals are converted into the unsharp mask signals by the LPF 57 which are most suitable to the size (pixel density) of a reproduced image selected as described above. The unsharp image signals are subjected to gradation conversion by the LUT 59 so that they are converted into the unsharp image signals $S_B$. Thereafter, the subtraction of the unsharp image signals $S_B$ from the digital image signals $S_A$ in the subtractor 61 results in difference signals Ssub. The thus obtained difference signals Ssub are subjected to gradation conversion, image density conversion, and the like by a LUT 63 and converted into analog signals by being input to a D/A converter 86 or the D/A converter of the driver 88 in a recording apparatus 24. The analog signals converted by the D/A converter 86 are input to a monitor 20 and reproduced as a visible image.

According to the image processing method and apparatus of the first and second embodiments of the present invention, in the dodging technique for preventing the details of the images at both a bright portion and a dark portion from becoming imperceptible due to insufficient gradation, a plurality of kinds of the low-pass filters are prepared to create unsharp images having a different mask size, a low-pass filter having a mask size corresponding to the pixel density (print size) of an image to be reproduced is selected therefrom and the dodging technique is carried out using unsharp image signals made by using the selected low-pass filter. As a result, the dodging technique can always achieve a similar effect even to a reproduced image having a different size.

Since the unsharp image signals are created based on the luminance signals of the digital image signals, even if the brightness of a reproduced image (in particular, the edge portion of the subject) changes, an image without an unnatural feeling which is similar to an original color image can be reproduced because the reproducibility of colors is not changed.

Since the unsharp image signals are created by photoelectrically reading out a projected image which is obtained by photoelectrically shading off the color image, calculation is not necessary different from, for example, a method of obtaining unsharp image signals by a calculation using an unsharp mask filter, whereby the apparatus can be simply arranged.

Further, in the arrangement in which the prescanning is carried out to previously measure the color image signals to be obtained, the unsharp signals are made from thinned-out signals which are obtained in such a manner that the prescanning detects the light having passed through a film by thinning out pixel data at predetermined intervals. Further, the unsharp image signals are created by interpolating the intervals at which the unsharp signals are thinned out. As a result, the unsharp image signals are created by using the signals which are obtained in the process for reproducing the digital image signals representing the color image as the visible image, whereby an image can be effectively reproduced.

Next, a third embodiment of the image processing apparatus of the present invention will be described in details with reference to FIG. 10 to FIG. 12.

Figure 10:
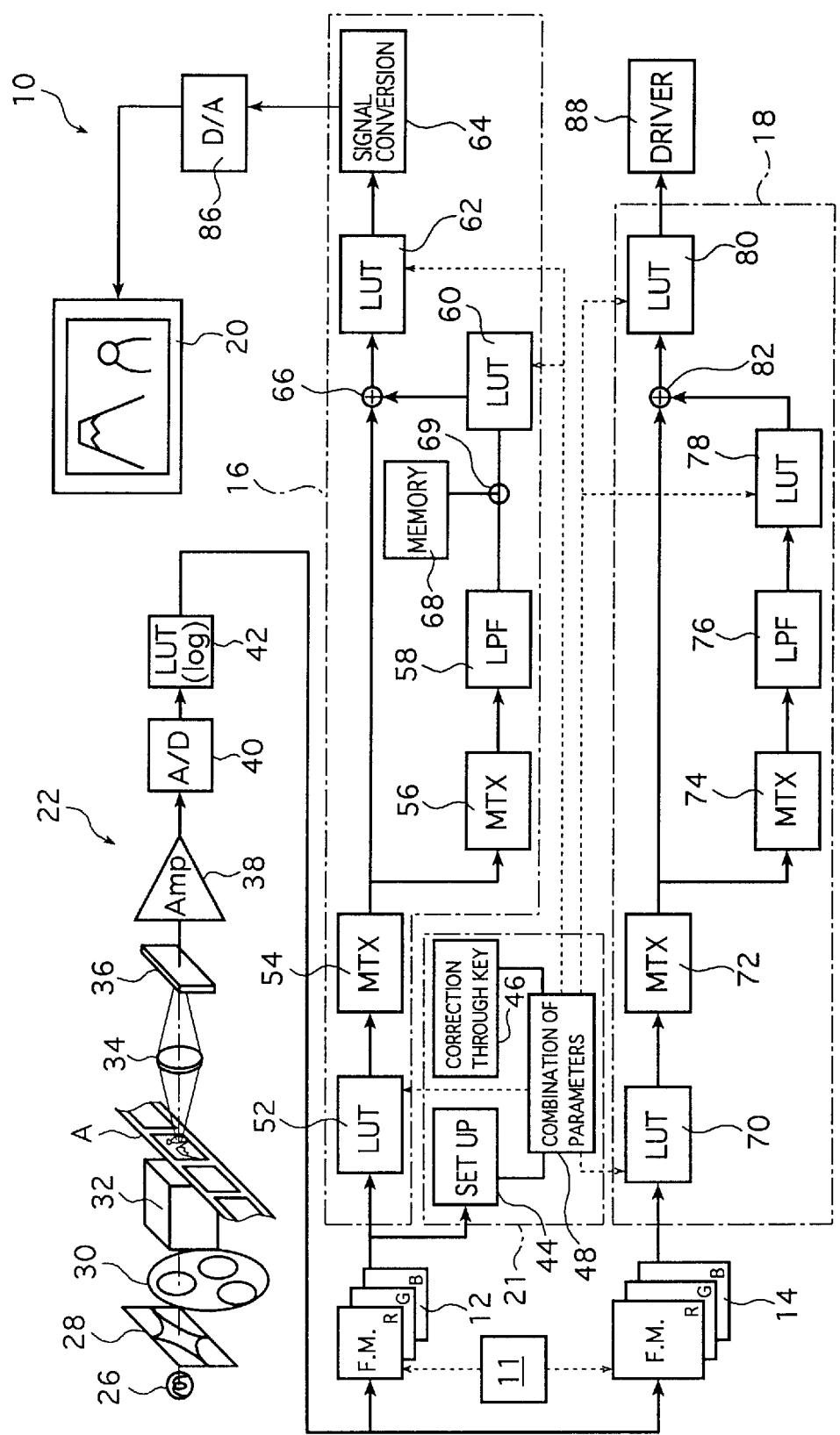
FIG. 10 is a block diagram showing a digital photo printer including a third embodiment of the image processing apparatus of the present invention and an embodiment of the image reading apparatus.

FIG. 10 is a block diagram showing an image reproducing apparatus to which the third embodiment of the image processing apparatus of the present invention is applied, that is, schematically showing an embodiment of a digital photo printer. Since the digital photo printer shown in FIG. 10 has the same arrangement as that of the image reproducing apparatus shown in FIG. 1 except the arrangement of an image processing apparatus 10, the same numerals as used in FIG. 1 are used to denote the same components in FIG. 10 and the detailed description thereof is omitted.

The digital photo printer shown in FIG. 10, to which the image processing apparatus of the third embodiment of the present invention is applied, carries out prescanning for coarsely reading out an output image at a low resolution before an image is read (finely scanned) to obtain the image information of an output image, likewise the second embodiment of the present invention. The image processing apparatus 10 sets up image processing conditions from various kinds of image information obtained from the prescanning and provides output image information by processing the image information obtained by the fine scanning in accordance with the image processing conditions to thereby permit a recording apparatus 24 to record the image.

A method of reading the image by the prescanning is fundamentally the same as that by the fine scanning. However, in the prescanning, since the pixels of the image information which are read by a CCD sensor 36 are thinned out at a predetermined thinning-out ratio under the control of the timing controller 11 connected to a prescan memory 12, the image information is arranged as coarse image information of a low resolution and processed by the processing apparatus 10.

The image processing apparatus 10 of the present invention to which an image is supplied (input) from a reading apparatus 22 arranged as described above includes the prescan memory 12, a fine scan memory 14, a display image processing section 16, a fine scan image processing section 18, a monitor 20, and an image processing condition setting section (hereinafter, referred to as a condition setting section) 21. Further, the timing controller 11 is connected to the prescan memory 12 and the fine scan memory 14 to control the reading-out of image information at every pixel.

The reading apparatus 22 supplies the prescanned image information to the prescan memory 12 and stores it therein and supplies the finely scanned image information to the fine scan memory 14 and store it therein.

The prescan memory 12 and the fine scan memory 14 fundamentally have the same arrangement and each of them is composed of three frame memories for storing red image information, green image information and blue image information supplied from the reading apparatus 22. Both the memories 12 and 14 may have a different memory capacity when necessary.

The image information stored in the prescan memory 12 is supplied to the display image processing section 16 and the condition setting section 21 and the image information stored in the fine scan memory 14 is supplied to the fine scan image processing section 18 respectively.

The condition setting section 21 includes a setup (processing condition setting) section 44, a key correcting section 46 and a parameter combining section 48.

The setup section 44 is used to set fundamental image processing conditions and includes a CPU and the like. The setup section 44 creates an image density histogram and calculates a maximum image density and a minimum image density from the image information stored in the prescan memory 12 and sets image processing conditions such as color/image density processing conditions and the like by a known method using matrix calculation, image processing algorithm, image processing tables and the like. More specifically, the setup section 44 creates or adjusts various kinds of conversion tables, correction tables, processing tables and the like.

Figures 11, 12:
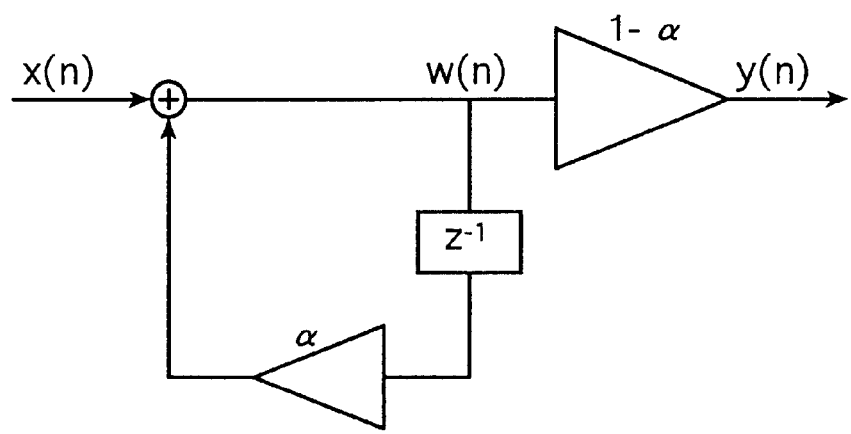
FIG. 11 is a conceptual view showing an example of an adjustment key connected to the image processing apparatus show in FIG. 10.
FIG. 12 is a circuit diagram showing an example of an infinite impulse response type low-pass filter used to the image processing apparatus shown in FIG. 10.

The key correcting section 46 calculates an amount of correction of the image processing conditions in accordance with data input by the operator through an adjustment key 50 shown in FIG. 12.

The adjustment key 50 shown in FIG. 11 can adjust, as an example, entire density (D), cyan (C) density, magenta (M) density, yellow (Y) density, image density gradation ($\gamma$), dodging effect ($\alpha$ light) on bright portion (highlight side), and dodging effect ($\alpha$ dark) on dark portion (shadow side).

The operator carries out a test while viewing an image displayed on the monitor 20 which will be described later and adjusts the image to a desired state by pressing (+) keys and (−) keys of respective parameters, that is, adjusting the image processing conditions. The respective amounts of correction can be adjusted in accordance with the number of times the keys are pressed. The operator may carry out the adjustment by making a display corresponding to the adjustment key 50 on the monitor 20 and operating a mouse or a key board, in addition to the above method of operating the keys.

The parameter combining section 48 combines the image processing conditions set by the setup section 44 with the amount of correction set by the key correcting section 46 to thereby obtain finally set image processing conditions. Therefore, when there is no data input from the adjustment key 50, the image processing conditions finally set the parameter combining section 48 are the same as those set at the setup section 44.

The image processing conditions set at the parameter combining section 48 are supplied to the predetermined LUTs of the display image processing section 16 and the fine scan image processing section 18 and the image information is processed under the image processing conditions. That is, when data is input through the adjustment key 50 and the image processing conditions set previously by the parameter combining section 48 are changed accordingly, dodging processing conditions which will be described later are also changed. Therefore, when data is input through the adjustment key 50, the image on the monitor 20 which shows the image information output from the display image processing section 16 is changed accordingly.

The display image processing section 16 reads out the prescanned image information stored in the prescan memory 12 and subjects it to various kinds of image processing in accordance with the image processing conditions set by the condition setting section 21 and further carries out the dodging technique (image information processing for obtaining an effect similar to that obtained by the dodging technique using direct exposure) when necessary to thereby arrange the prescanned image information as image information which will be displayed on the monitor 20. The display image processing section 16 includes a second LUT 52, a first matrix calculator (MTX) 54, a second MTX 56, a low-pass filter (LPF) 58, a third LUT 60, a fourth LUT 62, a signal converter 64, an adder 66 and a memory 68.

The fine scan image processing section 18 reads out the finely scanned image information stored in the fine scan memory 14 and subjects it to predetermined image processing in accordance with the image processing conditions set by the condition setting section 21 and further carries out the dodging technique when necessary to thereby arrange the finely scanned image information as output image information which will be recorded by the recording apparatus 24. The fine scan image processing section 18 includes a second LUT 70, a first MTX 72, a second MTX 74, a LPF 76, a third LUT 78 and a fourth LUT 80.

As apparent from the above description, both the image processing sections 16 and 18 are similar to the image processing section 17 of the image processing apparatus 10 of the present invention shown in FIG. 1 and have approximately the same arrangement. Further, the image processing carried out in the processing section 16 is fundamentally similar to that carried out in the processing section 18 as to image processing conditions and a method of carrying out the dodging technique except that they have the different number of pixels (resolution).

More specifically, in the image processing apparatus 10 of the third embodiment of the present invention, when the dodging technique is carried out to an image similar to the image information output to the monitor 20 (the image recorded at the recording apparatus 24), that is, to the output image, since the image to which the dodging technique has been carried out is displayed also on the monitor 20, the operator can carry out various operations while viewing and confirming an image similar to that recorded by the recording apparatus 24, whereby the creation of improper pints can be greatly reduced.

Both the image processing sections will be described below as to the display image processing section 16 as a representative example.

The second LUT 52 (the second LUT 70) reads out the image information stored in the prescan memory 12 (the fine scan memory 14) and adjusts the gray balance of the image information and corrects the brightness and the gradation thereof. Thus, tables are connected to each other in a cascade fashion to carry out the corrections and adjustments.

The respective correction (adjustment) tables of the second LUTs 52 and 70 are set or adjusted at the parameter combining section 48 of the aforesaid condition setting section 21.

The first MTX 54 (the first MTX 72) has the same function as that of the MTX 53 shown in FIG. 1 and corrects the colors of the image information processed by the second LUT 52. That is, the first MTX 54 (the first MTX 72) carries out a matrix calculation set in accordance with the spectral characteristics of a film A, the spectral characteristics of a photosensitive material (photographic paper) Z, the characteristics of development processing, and the like so that a resulting output image (information) is finished in appropriate colors.

When the dodging technique is carried out, the image information processed by first MTX 54 is supplied to the adder 66 (the adder 82) and the second MTX 56 (second MTX 74) for creating unsharp image information.

When the dodging technique is not carried out, the first MTX 54 (the first MTX 72) is directly connected to the fourth LUT 62 (the fourth LUT 80) through a bypass and no unsharp image information is created. Whether the dodging technique is carried out or not may be set by the mode selection input carried out by the operator, the determination from a result of the calculation executed at the condition setting section 21, or the like.

The second MTX 56 (the second MTX 74) has a function similar to that of the MTX 55 shown in FIG. 1 and creates the luminance image information of a read-out image from the red, green and blue image information transferred from the first MTX 54 (the first MTX 72).

The luminance image information is created by a method of using a value of one-third of the mean value of each of the RGB color image signals, a method of converting color image information into the luminance image information using the YIQ base, and the like.

The method of obtaining the luminance image information using the YIQ base includes a method of calculating only the Y component of the YIQ base from the red, green and blue image information by the following formula.

$$Y = 0.3R + 0.59G + 0.11B$$

The LPF 58 (the LPF 76) has a function similar to that of the LPF 57 shown in FIG. 1. The LPF 58 (the LPF 76) two-dimensionally shades off a bright and dark image by processing the bright and dark image information created by the second MTX 56 (74) through the LPF 58 (76) and taking out a low frequency component therefrom to thereby obtain the unsharp image information of a read-out image.

Although the LPF 58 (76) used in the above processing may be composed of a finite impulse response type (FIR) low-pass filter which is ordinarily used to create an unsharp image, it is preferable to employ an infinite impulse response type (IIR type) low-pass filter because it can create unsharp image information in which an image is made very unsharp in a small circuit. A filter such as the media filter disclosed in Japanese Patent Application No. 8-16646 may be preferably used.

FIG. 12 shows an example of the IIR type filter which includes an adder disposed in a forward direction and a delay circuit disposed in a feedback direction.

Since the resolution of the prescanned image information is different from that of the finely scanned image information, if they are processed by the same low-pass filter, an image displayed on the monitor 20 will be different from that reproduced on a finished print.

Accordingly, the frequency characteristics of the LPF 58 for processing the prescanned image information must be different from those of the LPF 76 for processing the finely scanned image information in accordance with their resolution. Specifically, it is necessary to reduce an amount of shading-off of the unsharp image information used for the display on the monitor 20 by a ratio of resolution and when the ratio of resolution is represented by m, the cut-off frequency of the LPF 58 is represented by fc(p) and the cut-off frequency of the LPF 76 is represented by fc(f), the low-pass filter must be designed to satisfy the following formula.

$$fc(p)=mfc(f)$$

The unsharp image information created by the LPF 58 (the LPF 76) is supplied to the third LUT 60 (third LUT 78) which has a function similar to that of the LUT 59 shown in FIG. 1 and subjected to a dynamic range compressing process thereat. The dynamic range compressing process is carried out by, for example, using a dynamic range compressing table created by the following method.

The setup section 44 has a function set thereto which determines the rate of dynamic range compression α of the entire area of the unsharp image created by the LPF 58 (76) from the dynamic range of read-out image information. The setup section 44 determines the compression rate of dynamic range α of the prescanned image information using the function.

Next, a basic dynamic range compression table is created using the compression rate α. The table is a monotonously decreasing function which uses a certain signal value as a reference, that is, as a point of intersection with the abscissa (output 0) and has an inclination of the compression rate α. It suffices only to set the signal value serving as the reference in accordance with a main subject and when a person is the main subject, the signal value is about 0.6.

The setup section 44 finally completes the dynamic range compression table by compressing the bright portion side (above the reference) and the dark portion side (below the reference) such that the maximum value and the minimum value of the signal value of image information are set within the range of the minimum image density and the maximum image density of a reproduced image (within the image reproducible region in a gradation conversion table set to the fourth LUT 62 (80) to be described later). The thus completed table is stored in the third LUT 60 (78) which will process the unsharp image information created by the LPF 58 (76) using the dynamic range compression table.

The dynamic range compressing process is described in details in the specifications of Japanese Patent Publications Nos. 7-283114 and 7-337509 filed by the applicant.

The thus obtained unsharp image information is supplied to the adder 66 (adder 82) which has a function similar to that of the subtractor 61 shown in FIG. 1 and acts as a subtractor The adder 66 (82) subtracts the unsharp image information from the main image information which has been processed by the first MTX 54 (72) and directly supplied to the adder 66 (adder 82) so as to give an effect similar to that resulting from the dodging technique carried out using surface exposure (a portion having an intermediate image density remains as it is and the image density of only the bright portion and/or the dark portion is adjusted) to the thus obtained image information.

The fourth LUT 62 (the fourth LUT 80) which has a function similar to that of the LUT 63 shown in FIG. 1 is the gradation conversion table for converting the image information subjected to the predetermined processing into image information in accordance with the final characteristics of a final output medium. That is, the fourth LUT 62 converts the gradation of the prescanned image information so that it is suitably displayed on the monitor 20 and the fourth LUT 80 converts the gradation of the finely scanned image information so that it is suitably corresponding to the color development of a photosensitive material Z.

The prescanned image information output from the fourth LUT 62 as described above is converted into signals corresponding to the monitor 20 by the signal converter 64 and further subjected to D/A conversion by the D/A converter 86 and then displayed on the monitor 20.

The finely scanned image information output from the fourth LUT 80 is supplied to the AOM driver 88 of the recording apparatus 24 shown in FIG. 6 and subjected to D/A conversion so that it is arranged as the modulated signals of an AOM 94.

The image displayed on the monitor 20 and the image of the finished print supplied to the recording apparatus 24 and reproduced thereon have been subjected to various kinds of processing and dodging processing in the same manner. Thus, an image similar to that of the finished print is displayed on the monitor 20.

As described above, the operator can carry out testing while viewing the image displayed on the monitor 20 and when necessary, the operator can adjust the image recorded on the finished print by adjusting entire density, cyan (C) density, magenta (M) density, yellow (Y) density, gradation, dodging effect on bright portion, and dodging effect on dark portion by pressing respective keys of the adjustment key 50. The dodging effect is adjusted by adjusting the compression ratio of the above bright portion and dark portion.

The data input by the operator through the adjustment key 50 is supplied to the key correcting section 46 and used as an amount of correction for correcting the image processing conditions. The parameter combining section 48 combines the amount of correction with the image processing conditions set by the setup section 44, so that image processing conditions are newly set after the correction is made through keys.

That is, the respective correction tables in the second LUT 52 and the second LUT 70, the dynamic range compression tables in the third LUT 60 and the third LUT 78 and the gradation conversion tables in the fourth LUT 62 and the fourth LUT 80 are adjusted or set again in response to the data input through the adjustment key 50.

Therefore, the image displayed on the monitor 20 is altered accordingly.

However, when unsharp image information is newly created using the second MTX 56 and the LPF 58 and displayed on the monitor 20 after the operator inputs data through the adjustment key 50, a time is consumed for the processing, by which productivity is lowered.

Accordingly, in the image processing apparatus 10 shown in FIG. 10, the memory 68 is interposed between the LPF 58 and the third LUT 60 and the LPF 58 is connected both the third LUT 60 and the memory 68 through a switching unit 69 at first and the unsharp image information created at the LPF 58 at first is supplied to the third LUT 60 as well stored in the memory 68. With this arrangement, when the operator inputs data though the adjustment key 50, the third LUT 60 is connected only to the memory 68 by the switching unit 69 to thereby read out the unsharp image information and then the processing thereafter is carried out. The above arrangement permits the processing to be carried out promptly because the unsharp image information need not be created again.

The data input by the operator through the adjustment key 50 also affects the image processing conditions at the second LUT 52 located upstream of the LPF 58. As a result, if an image is displayed on the monitor 20 using the unsharp image information read out from the memory 68 after the data is input through the adjustment key 50, the image displayed on the monitor 20 is different from the image resulting from the image information output from the fine scan image processing section 18.

To prevent the above problem, the processing apparatus 10 shown in FIG. 10 is arranged such that the image information output from the third LUT 60 is corrected in accordance with the amount of change of the image information output from the second MTX 56 which corresponds to the change of the image processing conditions at the second LUT 52 caused by the data input through the adjustment key 50, so that the image displayed on the monitor 20 after the data input through the adjustment key 50 corresponds to the adjustment carried out by the data input.

For example, it is supposed that a bright and dark image is created at the second MTX 56 by the method using the aforesaid YIQ base as shown below.

$$Y=0.3R+0.59G+0.11B$$

Then, an amount of change ΔY resulting from the adjustment of the image information output from the second MTX 56 can be calculated by converting the amount of change resulting from the adjustment carried out by the adjustment key 50 into ΔR, ΔG and ΔB which are the amounts of change of red, green and blue and using the following formula.

$$\Delta Y=0.3\Delta R+0.59\Delta G+\Delta 0.11B$$

The correction of the ΔY is added to the third LUT 60 (the dynamic range compression table is rewritten) to thereby cause the image displayed on the monitor 20 after the data input to correspond to the data which has been input through the adjustment key 50.

As described above, when the processing at the fourth LUT 80 of the fine scan image processing section 18 is finished, the finely scanned image information which is arranged to correspond to the image recorded on the finished print is supplied to the driver 88 of the recording apparatus 24 as output image information.

Although the image processing apparatus according to the third embodiment is fundamentally arranged as described above, how the image processing apparatus of the third embodiment and the digital photo printer using the image processing apparatus operate will be briefly described below.

When the film A serving as an original image is loaded to a predetermined position and a print creation start command is issued after the apparatus is set up, an amount of light from a light source 26 is stabilized and predetermined jobs such as the setting of the opening reference value of a diaphragm 28, the adjustment of temperature at a development section 92 and the like are finished, prescanning is started to coarsely read out the image on the film A at a low resolution.

When the prescanning starts, reading-out light, which has been produced by the light source 26, whose amount of light has been adjusted at the diaphragm 28, whose color (for example, green light) has been adjusted through a color filter plate 30 and which has been diffused by a diffusion box 32, passes through the film A. Thus, the reading-out light is converted into a projected light which carries the green image of the film A and the image is formed to a CCD sensor 36 through an image forming lens 34 and photoelectrically read out by it.

Signals output from the CCD sensor 36 are amplified by an amplifier 38 and converted into digital signals by an A/D converter 40 and then converted into image density signals at a first LUT 42 and stored in the green image frame memory of a prescan memory 12.

Next, the color filter plate 30 is switched to a red filter which acts on a light passage such that a red image is read out and stored in the red image frame memory of the prescan memory 12 likewise. In the same manner, a blue image is read out and stored in the blue image frame memory of the prescan memory 12, by which the prescanning is finished.

On the completion of the prescanning, fine scanning starts at the reading apparatus 22 and the green image, the red image and the blue image of the image recorded on the film A are sequentially read out by the switching of the color filter plate 30 likewise and stored in the frame memories of a fine scan memory 14 to which the respective color images correspond.

On the completion of the prescanning, the setup section 44 of the condition setting section 21 reads out the prescanned image information from the prescan memory 12, sets image processing conditions by creating image density histograms and the like to thereby create various conversion tables, correction tables, and the like and outputs the image processing conditions to the parameter combining section 48.

The parameter combining section 48 transfers the image processing conditions supplied thereto to the second LUTs 52 and 70, the third LUTs 60 and 78, and the fourth LUTs 62 and the 80 of the display image processing section 16 and the fine scan image processing section 18 and sets them as image processing tables.

When the image processing conditions are set, the second LUT 52 of the display image processing section 16 reads out the prescanned image information from the prescan memory 12 and subjects it to the processing carried out through the respective set tables. Thereafter, the colors of the image information are corrected at the first MTX 54. When dodging is carried out, the image information processed at the first MTX 54 is supplied to the adder 66 and the second MTX 56.

The second MTX 56 creates the luminance image information of the image read out from the image information supplied thereto. The luminance image information is converted into unsharp image information at the LPF 58 and further subjected to dynamic range compression processing at the third LUT and supplied to the adder 66 as unsharp image information used to the dodging.

The adder 66 subtracts the unsharp image information used to the dodging from the image information processed at the first MTX 54 and creates image information which will be displayed on the monitor 20.

The gradation of the image information output from the adder 66 is converted at fourth LUT 62 so that the image information is arranged as an image which is suitably displayed on the monitor 20. Further, the above image information is converted into signals in accordance with the display on the monitor 20 at the signal converter 64, converted into analog signals at a D/A converter 86 and displayed on the monitor 20.

The operator carries out testing while viewing the image displayed on the monitor 20 and when necessary, the operator carries out various adjustments using the adjustment key 50. When data is input through the adjustment key 50, an amount of correction of the image processing conditions is calculated at the key correcting section 46, the parameter combining section 48 combines the amount of correction with the image processing conditions set by the setup section 44 such that the image processing conditions are set again or changed, the tables set to the respective LUTs of the display image processing section 16 and the fine scan image processing section 18 are changed accordingly and the image on the monitor 20 is changed.

When the operator determines that the image is proper (test: OK), an output command is issued and the second LUT 70 of the fine scan image processing section 18 reads out finely scanned image information from the fine scan memory 14.

Thereafter, image processing similar to that applied to the aforesaid prescanned image information is also carried out to the finely scanned image information and the finely scanned image information is supplied to the driver 88 of the recording apparatus 24 as image information which will be output and recorded to the photosensitive material Z.

Note, the above testing is not always necessary and, for example, a print may be created without testing by setting an full automatic mode or the like. In this case, the second LUT 70 starts to read out the finely scanned image information and carries out image processing at the time, for example, when the setup section 44 sets the image processing conditions and the parameter combining section 48 sets the image processing conditions to the respective LUTs.

When the recording apparatus 24 receives the output image information, light beams are generated by respective light sources 96 and modulated in accordance with a recording image by the respective AOMs 94 which are driven by the driver 88 in accordance with the recording image. The direction of the light beams is changed in the main scanning direction by a polygon mirror 98 and the photosensitive material z being conveyed in a sub-scanning direction is scanned with and exposed to the light beams through a f θ lens 100 in the two-dimensional directions to thereby create a latent image.

After the thus exposed photosensitive material Z is subjected to predetermined processing at a color development tank 106, a bleach-fix tank 108 and a washing tank 116 and then dried, it is cut by a cutter to a predetermined length corresponding to a single sheet of a print P.

As described above in detail, according to the image processing method of the present invention and the image processing apparatus of the present invention embodying the method, an image having good image quality can be recorded in such a manner that image information which has been photoelectrically read out is subjected to image processing and the dodging is carried out to the image information output for recording when necessary as well as the operator can carry out a job while confirming an dodging effect. Thus, a properly finished print, in which the dodging effect is sufficiently exhibited and the image having good image quality is reproduced, can be stably obtained.

Next, a fourth embodiment of the image processing apparatus of the present invention will be described in details with reference to FIG. 13 to FIG. 23.

Figure 13:
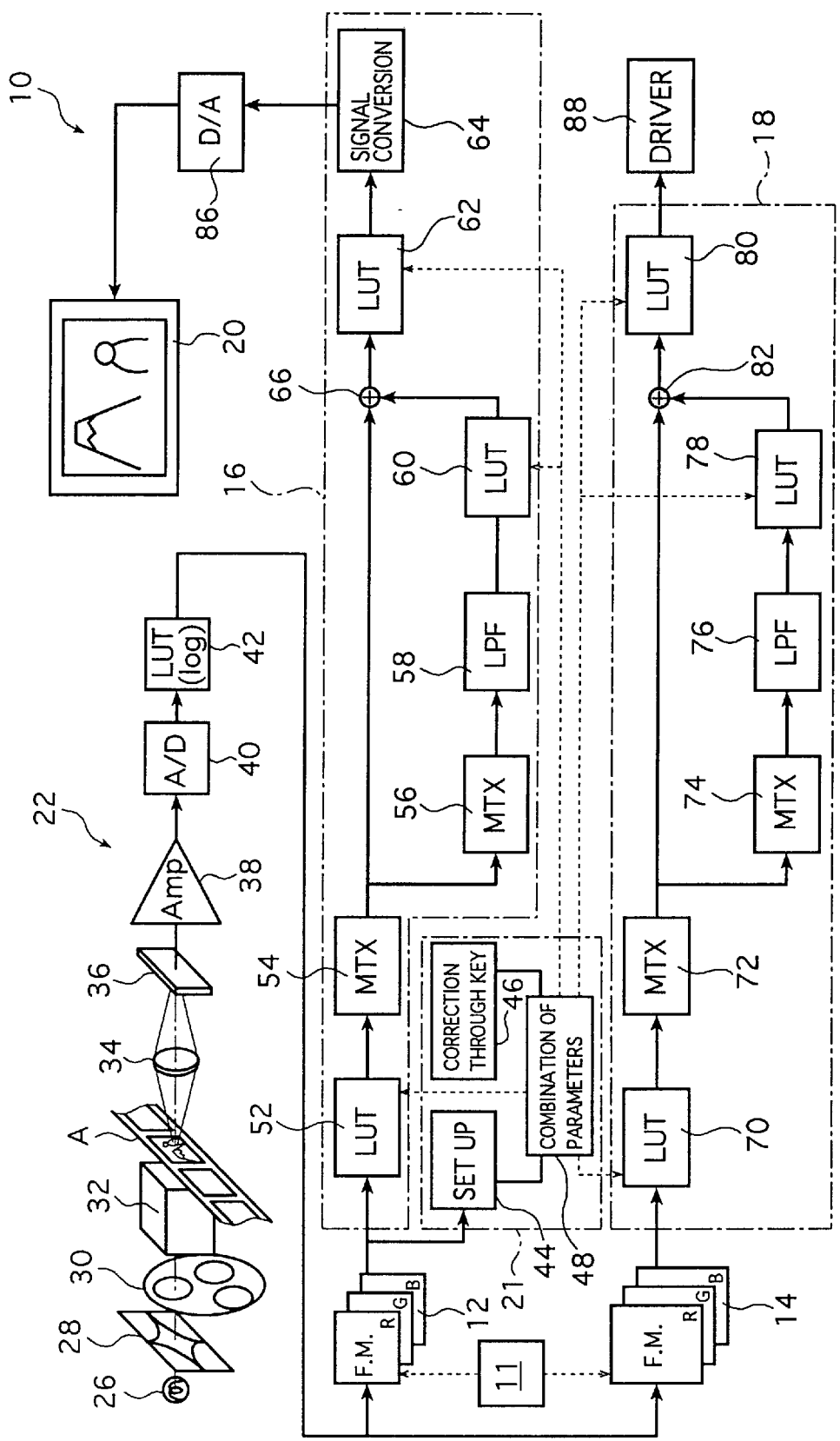
FIG. 13 is a block diagram showing an embodiment the digital photo printer including the image processing apparatus and the image reading apparatus of the present invention.

FIG. 13 is a block diagram schematically showing an embodiment of a digital photo printer to which the image processing apparatus according to the fourth embodiment of the present invention is applied.

Since the digital photo printer shown in FIG. 13 has the same arrangement as that of the digital photo printer shown in FIG. 10 except the arrangement of the display image processing section 16 of an image processing apparatus 10, specifically, a memory 68 and switching unit 69, the same numerals as used in FIG. 10 are used to denote the same components in FIG. 13 and the described thereof is omitted.

In the image processing apparatus 10 shown in FIG. 13, a display image processing section 16 and a fine scan image processing section 18 are arranged as described below.

The display image processing section 16 reads out the prescanned image information stored in a prescan memory 12 and subjects it to various kinds of image processing in accordance with the image processing conditions set by a condition setting section 21 to thereby arrange the prescanned image information as image information which will be displayed on a monitor 20. The display image processing section 16 includes a second LUT 52, a first matrix calculator (MTX) 54, a second MTX 56, a low-pass filter (LPF) 58, a third LUT 60 a fourth LUT 62, a signal converter 64 and an adder 66.

The fine scan image processing section 18 reads out the finely scanned image information stored in a fine scan memory 14 and subjects it to predetermined image processing in accordance with the image processing conditions set by the condition setting section 21 to thereby arrange the finely scanned image information as output image information which will be recorded by a recording apparatus 24. The fine scan image processing section 18 includes a second LUT 70, a first MTX 72, a second MTX 74, a LPF 76, a third LUT 78 and a fourth LUT 80.

As apparent from the above description, both the image processing sections 16 and 18 have approximately the same arrangement. Further, the image processing carried out in the processing section 16 is fundamentally similar to that carried out in the processing section 18 as to image processing conditions and processing methods except that they have the different number of pixels (resolution).

More specifically, in the image processing apparatus 10 shown in FIG. 13, since an image similar to the output image information (the image recorded by a recording apparatus 24) is displayed on the monitor 20, the operator can carry out various operations while viewing and confirming the image similar to that recorded by the recording apparatus 24, whereby the creation of improper pints can be greatly reduced.

Both the image processing sections will be described blow as to the fine scan image processing section 18 as a representative example.

The second LUT 70 (the second LUT 52) reads out the image information stored in the fine scan memory 14 (the prescan memory 12) as described above and adjusts the gray balance of the image information and corrects the brightness and the gradation thereof. Thus, tables are connected to each other in a cascade fashion to carry out the corrections and adjustments.

The respective correction (adjustment) tables of the second LUT 70 (second LUT 52) are set or adjusted at a parameter combining section 48 of the aforesaid condition setting section 21.

FIG. 14 shows an example of a table set by the second LUT 70 (second LUT 52).

Figure 14A:
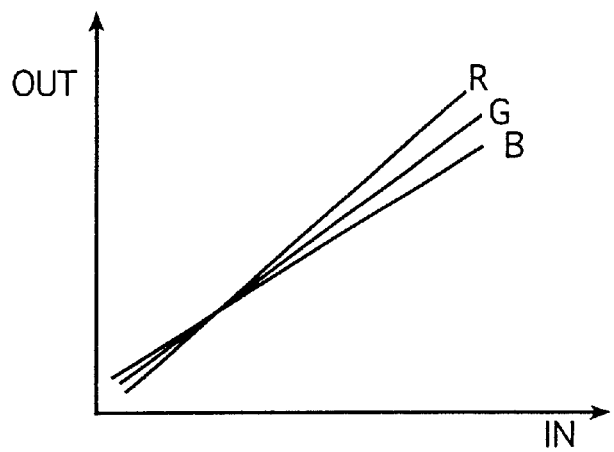
FIG. 14(a) shows a gray balance adjustment table.

FIG. 14(a) shows a gray balance adjustment table. A setup section 44 creates the gray balance adjustment table by achieving a gray balance by a known method from a maximum image density and a minimum image density calculated. When data is input from an adjustment key 50, an amount of correction is calculated by a key correcting section 46 and a parameter combining section 48 combines the amount of correction and the adjustment table created by the setup section 44, so that the inclinations of the respective red, green, and blue tables of the adjustment table are changed.

Figure 14B:
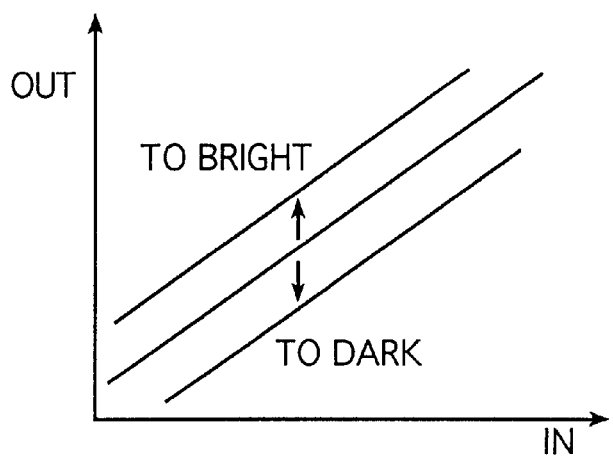
FIG. 14(b) shows a brightness correction table and FIG. 14(c) shows a gradation correction table, respectively.

FIG. 14(b) shows a brightness correction table. The setup section 44 creates the brightness correction table using a known setting algorithm from an image density histogram, a maximum image density and a minimum image density created. The correction table is adjusted as shown in FIG. 14(b) in response to the data input through the image density key (D) of the adjustment key 50 likewise the gray balance adjustment table.

Figure 14C:
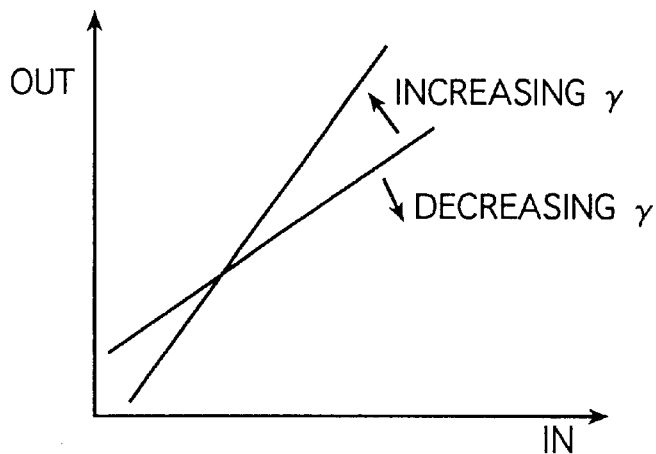

FIG. 14(c) shows a gradation correction table. The setup section 44 creates the gradation correction table using a known setting algorithm from the image density histogram, the maximum image density and the minimum image density created. The correction table is adjusted as shown in FIG. 14(c) in response to the data input through the gradation key (γ) of the adjustment key 50 likewise the gray balance adjustment table.

The image information processed by the second LUT 70 (second LUT 52) is supplied to the first MTX 72 (first MTX 54) and subjected to color correction as described above.

The image information processed by the first MTX 72 (52) is supplied to the adder 82 (adder 66) and the second MTX 74 (second MTX 56) for creating image information for carrying out various kinds of image processing such as the dodging (compression of a dynamic range while maintaining an intermediate gradation), correction of under-exposure/over-exposure of a film image serving as an original image (expansion of the dynamic range while maintaining the intermediate gradation) and the like.

When the various kinds of processing such as the dodging and the like are not carried out, the first MTX 72 is directly connected to the fourth LUT 80 (the first MTX 54 is directly connected to the fourth LUT 62) which will be described later through a bypass and the image information which is used for processing is not created. Further, whether the processing is carried out or not may be set by the mode selection input carried out by the operator, the determination from a result of the calculation executed at a condition setting section 21, or the like.

The second MTX 74 (second MTX 56) creates luminance image information of a read-out image from each of the red, green and blue image information supplied from the first MTX 72 (first MTX 54) as described above.

The luminance image information created by the second MTX 74 (second MTX 56) is supplied to the LPF 76 (LPF 58), processed thereby as described above and converted into the unsharp image information of the read-out image. Note, a bypass is formed between the second MTX 74 (second MTX 56) and the third LUT 78 (third LUT 60) and when the film image serving as the original image is over-exposed or under-exposed, the LPF 76 (LPF 58) fundamentally carries out no processing and the luminance image information created by the second MTX 74 (second MTX 56) is supplied to the next third LUT 78 (third LUT 60).

The unsharp image information created by the LPF 58 (or the luminance image information created by the second MTX 74) is supplied to the third LUT 78 (third LUT 60) and processed by the dynamic range compression (expansion) table.

The range of image density of an image which can be recorded on a film A is ordinarily wider than the reproducible area in a finished print. In a backlighted scene and an image recorded using an electronic flash, for example, an image may be recorded in the range of image density which greatly exceeds the reproducible area of the finished print. Further, the film A is not always properly exposed and often in so-called over-exposure/under-exposure states.

Figure 15:
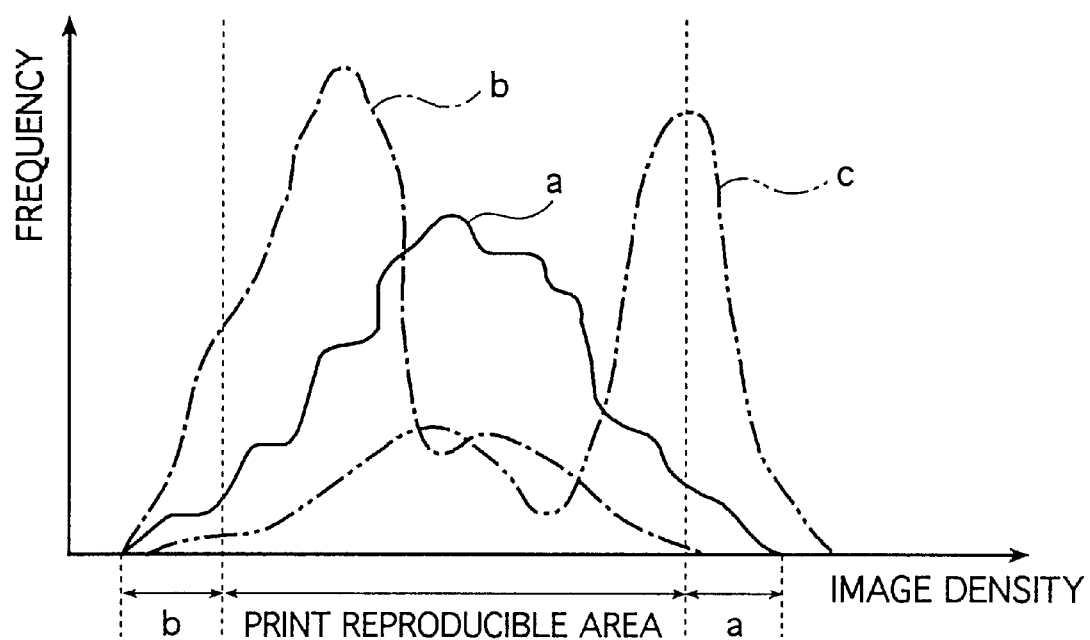
FIG. 15 shows an example of an image density histogram to be processed by the image processing apparatus shown in FIG. 13.

FIG. 15 shows an example of an image density histogram created from the image information of a read-out negative film by the setup section 44.

When the reproducible area in a finished print is located within the region of image density shown by broken lines in FIG. 15, all the pixels of the images shown by a to c cannot be reproduced in a finished print. That is, a high image density portion outside of the reproducible area (where the intensity of read-out signals is weak) will be become black and its details will become imperceptible, i.e. the pixels in a dark portion outside of the reproducible area will be clipped to black (in the finished print, a bright portion will be become white and its details will become imperceptible). On the contrary, a low image density portion outside of the reproducible area will become white and its details will become imperceptible, i.e. the pixels in a bright portion outside of the reproducible area will be clipped to white (in the finished print, a dark portion will become black and its details will become imperceptible). To obtain an image in which all the image information is reproduced, the dynamic range of the image information must be compressed so that it corresponds to the reproducible area of the finished print. That is, it is necessary to process the image information in such a manner that the dynamic range is compressed by adjusting the image density of the bright portion and the dark portion without changing the gradation of a portion having an intermediate image density so that an effect similar to that obtained by the dodging technique using direct exposure is achieved.

When the image of a film A serving as an original image is over exposed, there is a tendency that a dark portion side becomes black as a whole (in a finished print, an image density increases at a bright portion and pure white cannot be obtained) so that the image will become dull. Whereas, when the image is under-exposed, the image density increases at a bright portion (in the finished print, the image density decreases at a dark portion and pure black cannot be obtained). Thus, there is also a tendency that the image become dull.

Therefore, although it is necessary to increase the inclination of a gradation curve to thereby perform contrast enhancement to obtain an image of high image quality, in cases where an image is over-exposed, the inclination of the gradation curve is increased at a dark portion without changing the gradation at an intermediate image density portion, whereas in cases where an image is under-exposed, the inclination of the gradation curve is increased at a bright portion without changing the gradation at the intermediate image density portion.

In the image processing apparatus 10 shown in FIG. 13, a dodging effect is given by non-linearly compressing the dynamic range of main image information processed at the first MTX 72 (first MTX 54) in such a manner that unsharp image information (or luminance image information) processed by the dynamic range compression (expansion) table of the third LUT 78 (third LUT 60) is added (subtracted) to the main image information. Otherwise, output image information, from which a finished print having an image of high image quality realized therein can be obtained, is obtained in such a manner that over-exposure/under-exposure is corrected by non-linearly increasing the inclination of the gradation curve of the main image information and the dynamic range of the output image information and the gradation and the image density of the dark portion/bright portion thereof are properly arranged.

That is, the dynamic range compression (expansion) table of the third LUT 78 (third LUT 60) is a table for image processing the unsharp image information or the luminance image information to obtain processing image information for properly setting the dynamic range and the like of the main image information. The table is created by the setup section 44 from prescanned image information and a state of an image discriminated using the prescanned image information.

Fundamentally, the dynamic range compression table (hereinafter, referred to as a compression table) for providing the dodging effect is used to non-linearly compress the bright portion and the dark portion of the main image information independently so that the dynamic range of output image information is located within the print reproducible area of the image density histogram shown in FIG. 15. An example of a method of creating the table is as described below.

First, the setup section 44 automatically sets up the compression ratios of the bright portion and the dark portion from the read-out prescanning information.

Figure 16A:
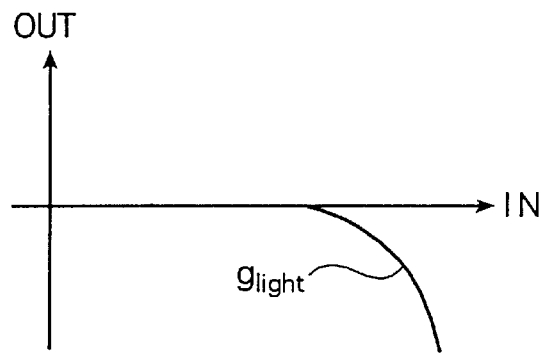
FIG. 16(a) and FIG. 16(b) show examples of a basic table for creating a dynamic range compression table, respectively.
Figure 16B:
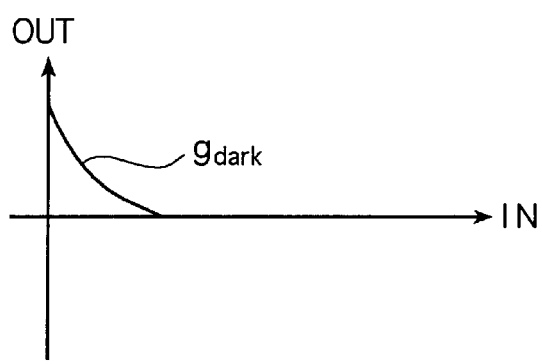

That is, the setup section 44 stores a basic table $g_{light}$ for compressing the bright portion shown in FIG. 16(a) and a basic table $g_{dark}$ for compressing the dark portion shown in FIG. 16(b). The compression table of the bright portion is set by $A \times g_{light}$ and the compression table of the dark portion is set by $B \times g_{dark}$, respectively.

That is, a compression ratio fauto in the automatic setup is determined by the following formula.

$$f_{auto} = A \times g_{light} + B \times g_{dark}$$

In the above formula, the coefficients A and B are set within the ranges of $0 \leq A \leq 1$, $0 \leq B \leq 1$ and they are suitably determined in accordance with a discriminated state of a film image, specifically, in accordance with frequencies of a bright portion and a dark portion, the maximum image density and the minimum image density of an image density histogram, an amount of image characteristics, an average image density and the like, whereby compression tables of the bright portion and the dark portion are set.

That is, in the case of the image of the histogram b shown by the dot-dash-line in FIG. 15, since dark portions have a high frequency, it can be determined that the image is recorded using an electronic flash or the like at night. In this type of the image, the compression ratio on a bright portion side is set to a large value, that is, the coefficient A multiplied to glight is set to a large value. When an image is recorded using an electronic flash or the like at night, since a main subject is ordinarily located on the bright portion side of a histogram, there is a tendency that the main subject is made bright and white and its details become imperceptible. However, the above processing can make the main subject to a proper image density (brightness).

On the contrary, in the image of the histogram c shown by the two-dot-and-dash-line in FIG. 15, since bright portions have a high frequency, it can be determined that the image is recorded in a snow scene or in a backlighted scene. In this type of the image, the compression ratio on a dark portion side is set to a large value, that is, the coefficient B multiplied to gdark is set to a large value. When an image is recorded in a backlighted scene and the like, since a main subject is ordinarily located on the dark portion side of a histogram, there is a tendency that the main subject is made dark. However, the above processing can finish the main subject to a bright image of good image quality.

When the maximum density and the minimum density of the image density histogram is greatly displaced from the print reproducible area, the compression ratio must be increased at both the bright portion and the dark portion.

Figure 17A:
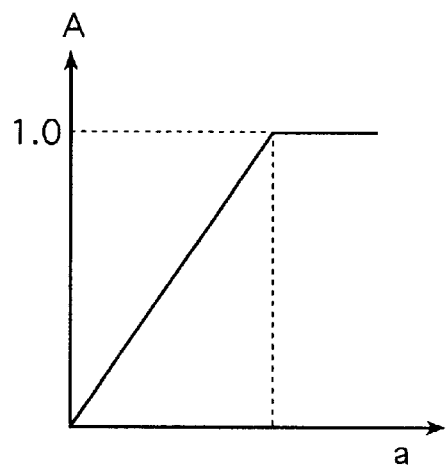
FIG. 17(a) shows an example of a table for determining a coefficient to be multiplied to the basic table shown in FIG. 16(a) and FIG. 17(b) shows an example of a table for determining a coefficient to be multiplied to the basic table shown in FIG. 16(b), respectively.
Figure 17B:
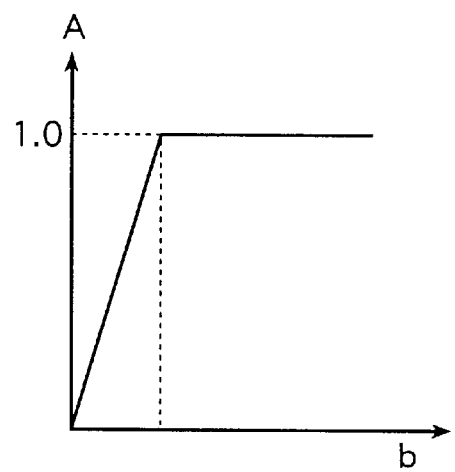

As an example of the method of determining the coefficients A and B, there is proposed, for example, a method of preparing a table as shown in FIG. 17(a) which shows the relationship between the image density region a dislocated to the bright portion side and the coefficient A and a table as shown in FIG. 17(b) which shows the relationship between the image density region b dislocated to the dark portion side and the coefficient B and determining the coefficients A and B. In the above method, a represents the extent of the image density area which is dislocated from the print reproducible area to the bright portion side and b represents the extent of the image density area which is dislocated from the print reproducible area to the dark portion side in the image density histogram shown in FIG. 15 (both of a and b are shown in the histogram a in FIG. 15).

Figure 18A:
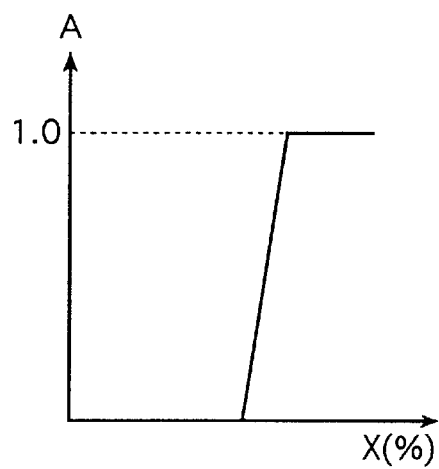
FIG. 18(a) shows another example of the table for determining the coefficient to be multiplied to the basic table shown in FIG. 16(a) and FIG. 18(b) shows another example of the table for determining the coefficient to be multiplied to the basic table shown in FIG. 16(b), respectively.
Figure 18B:
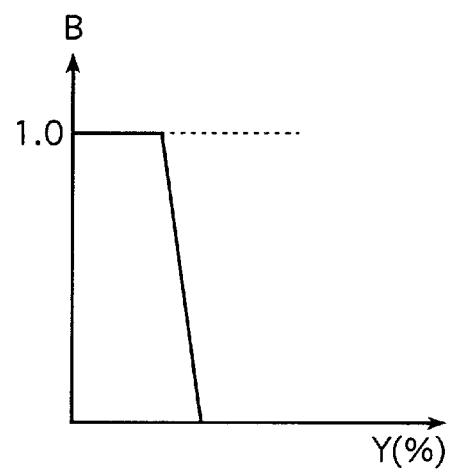
Figure 19:
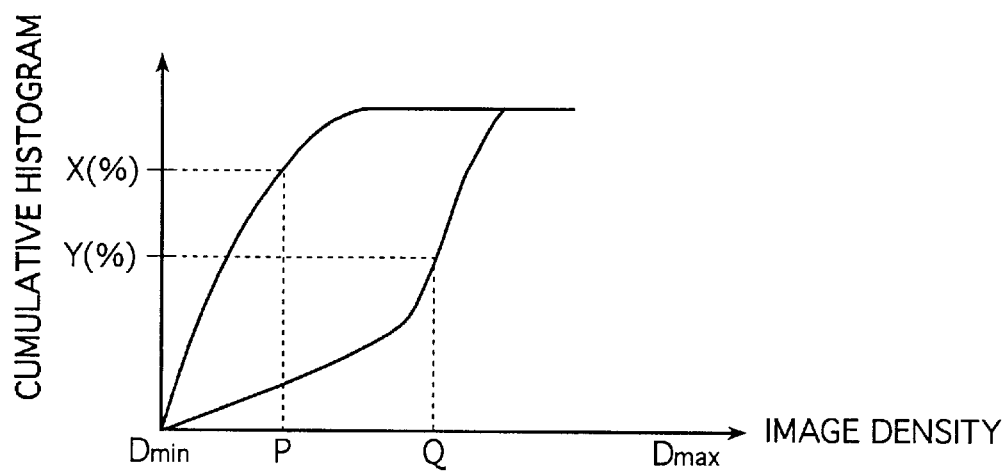
FIG. 19 shows an example of a cumulative histogram of image density to be processed by the image processing apparatus shown in FIG. 13.

Otherwise, there is also proposed a method of determining the coefficient A and the coefficient B. According to the method, there are prepared a table showing the relationship between the frequency on a dark portion side (cumulative percent=X%) and the coefficient A as shown in FIG. 18(a) and a table showing the relationship between the frequency on a bright portion side (cumulative percent=Y%) and the coefficient B as shown in FIG. 18(b). Further, the cumulative histogram of an image density as shown in FIG. 19 is prepared from an image density histogram created and a cumulative percentage at the dark portion and a cumulative percentage at the bright portion are calculated from the print reproduction limit P on the dark portion side and the print reproduction limit Q on the bright portion side using the cumulative histogram to thereby determine the coefficient A and the coefficient B using the table shown in FIG. 18.

In addition to the above methods, the present invention preferably proposes a method of determining the coefficient A and the coefficient B by calculating coefficients A and coefficients B from the tables shown in FIG. 17 and FIG. 18 and averaging the respective coefficients A and the respective coefficients B and a method of determining the coefficient A and the coefficient B by calculating coefficients A and coefficients B from the tables shown in FIG. 17 and FIG. 18 and setting the coefficient A to the largest value of the thus calculated coefficients A and setting the coefficient B to the largest value of the thus calculated coefficients B.

Furthermore, the coefficient A and the coefficient B may be determined by selecting whether the table shown in FIG. 17 is used or the table shown in FIG. 18 is used from the created image density histogram.

Although the compression ratio $f_{auto}$ is fundamentally determined as described above in the automatic setup, when data is input through an adjustment key 50, fkey shown below is determined by a key correcting section 46 and $f_{auto}$ is added to $f_{key}$ by a parameter combining section 48. That is, a total compression ratio $f_{total}$ is set by the following formula by adding them.

$$f_{total} = f_{auto} + f_{key}$$

when no data is input through the adjustment key 50, since $f_{key}$ is 0, $f_{auto}$ having been set up at the setup section 44 becomes $f_{total}$.

In the adjustment of the compression ratio using the adjustment key 50, the compression ratios of respective regions can be adjusted by independently and arbitrarily setting a compression table $f(\alpha)$ for adjusting the total compression ratio, a compression table for adjusting the compression ratio at the bright portion $f_{light}(\alpha_{light})$, and a compression table for adjusting the compression ratio at the dark portion $f_{dark}(\alpha_{dark})$ That is, $f_{key}$ is set by the following formula.

$$f_{key} = f(\alpha) + f_{light}(\alpha_{light}) + f_{dark}(\alpha_{dark})$$

The compression table $f(\alpha)$ for determining the compression ratio of entire image information is fundamentally set as described below.

Figure 20:
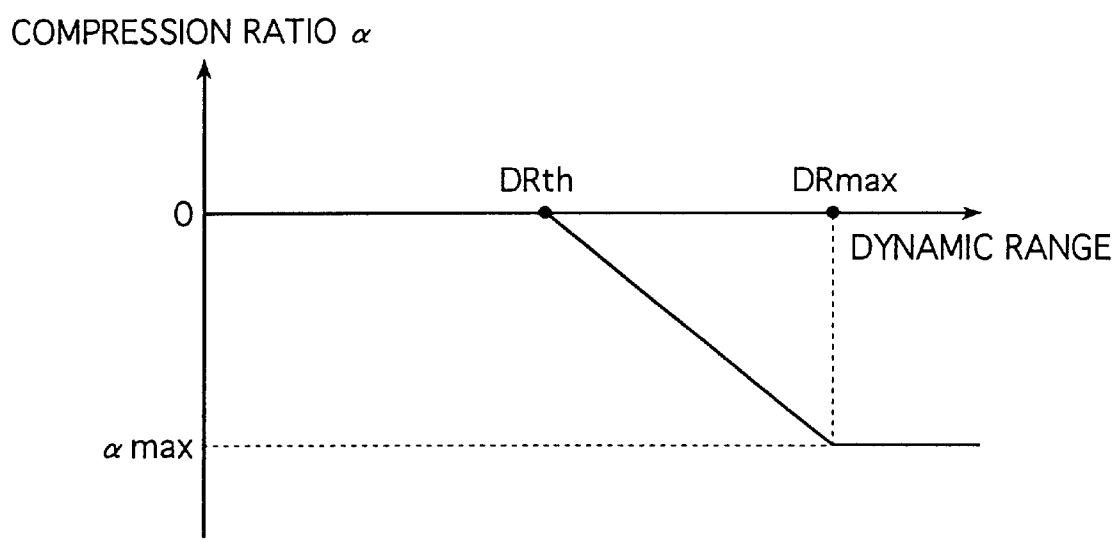
FIG. 20 is a graph showing a function for determining an entire compression ratio.

A function as shown in, for example, FIG. 20 is set to the key correcting section 46 and the compression ratio α is calculated from the dynamic range (DR) of image information.

The function is set such that when the dynamic range is smaller than a threshold value $DR_{th}$, the compression ratio becomes 0 and the dynamic range is not compressed in an image having a small dynamic range. This is because that when the image having the small dynamic range is compressed, the contrast of the image is lowered and an image quality is degraded on the contrary.

It has been known from the examination of the inventors that a better image can be obtained from an image having a spot-like brightest portion resulting from an electric lamp or the like existing in the image in such a manner that the portion having a lowest image density is made white in a finished print rather than making gradation to the portion by a dynamic range compressing process. Thus, even if the dynamic range becomes greater than the threshold value $DR_{max}$ in the function shown in FIG. 20, the compression ratio $\alpha$ is not more increased.

Figure 21A:
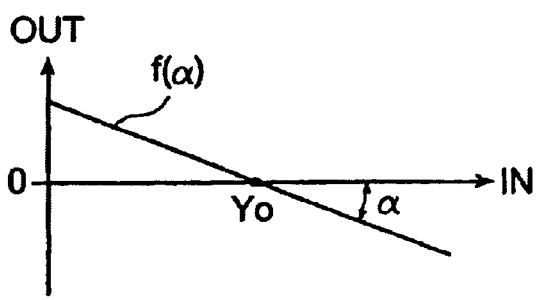
FIGS. 21(a), (b), (c), (d) and (e) show examples of the dynamic range compression table of the image processing apparatus shown in FIG. 13, respectively.

When, for example, a $\gamma$ key is pressed through the adjustment key 50, the key correcting section 46 reads out the compression ratio $\alpha$ from the function shown in FIG. 20 and a total compression table $f(\alpha)$ as shown in FIG. 21(a) is created using the compression ratio $\alpha$.

The table is a monotonously decreasing function which uses a certain signal value as a reference value $Y_0$, that is, as a point of intersection with the abscissa (output 0) and has an inclination of the compression rate $\alpha$. The reference value $Y_0$ is a reference image density which may be suitably set in accordance with an image density of a main subject or the like which serves as the center of an image. When, for example, a person is the main subject, the reference value $Y_0$ is a print image density which is approximately the same image density as that of a skin color. In this case, the reference value $Y_0$, is set between 0.5 and 0.7 and preferably to about 0.6.

Further, the compression ratio set by the compression table $f(\alpha)$ may adjusted by, for example, pressing the $\gamma$ key.

Figure 21B:
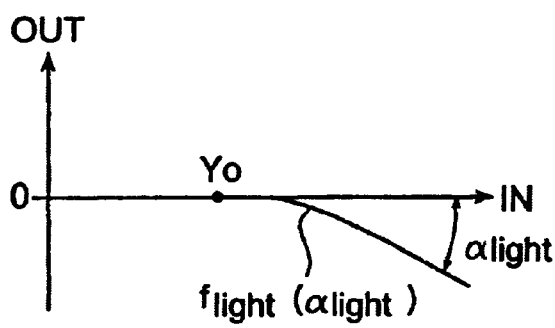

When the bright portion adjustment key ($\alpha$ light) of the adjustment key 50 is pressed, the key correcting section 46 sets the bright portion compression ratio $\alpha_{light}$ from an amount of adjustment having been input (the number of times the key is pressed) and creates the bright portion compression table $f_{light}(\alpha_{light})$ As shown in FIG. 21(b), the bright portion compression table $f_{light}(\alpha_{light})$ is a decreasing function having an output which is located below the abscissa (output: 0, minus side) on the bright portion side from the reference value $Y_0$ value and the inclination of a straight portion is set to the bright portion compression ratio $\alpha_{light}$. Note, the output on the dark portion side from the reference value $Y_0$ is 0.

When the dark portion adjustment key ($\alpha$ dark) of the adjustment key 50 is pressed, the key correcting section 46 sets the dark portion compression ratio $\alpha_{dark}$ from an amount of adjustment having been input and creates the dark portion compression table $f_{dark}(\alpha_{dark})$.

Figure 21C:
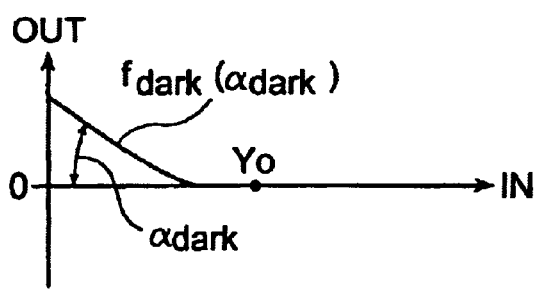

As shown in FIG. 21(c), the dark portion compression table $f_{dark}(\alpha_{dark})$ is a decreasing function having an output which is located above the abscissa on the dark portion side from the reference value $Y_0$ and the inclination of a straight portion is set to the dark portion compression ratio $\alpha_{dark}$. Note, the output on the bright portion side from the reference value $Y_0$ is 0.

When it is determined that the compression ratio which is set up by the automatic setup is too high, it is possible to reduce the compression ratio by the adjustment key 50.

When the reference value $Y_0$ is fixed and the bright portion compression ratio and the dark portion compression ratio are independently set, the dynamic range can be compressed by adjusting only the bright portion and the dark portion without changing the gradation of an intermediate image density portion. Moreover, since the change of brightness of an entire image caused by the compression of the dynamic range can be prevented, brightness can be independently corrected by the second LUT 70, whereby image processing conditions can be easily set.

Figure 21D:
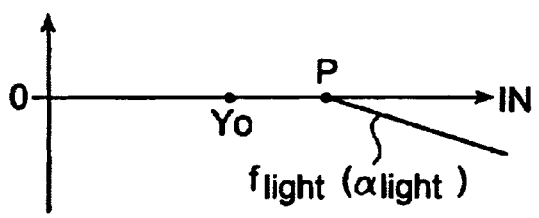
Figure 21E:
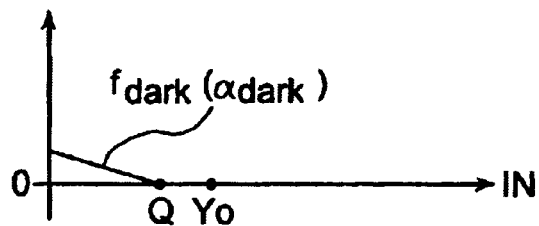

Note, when $f_{light}(\alpha_{light})$ and $f_{dark}(\alpha_{dark})$ are set to the functions shown in FIG. 21(d) and FIG. 21(e), artifact is caused by the discontinuation of $\gamma$ at a point P and a point Q. Thus, it is preferable to prevent the occurrence of the artifact by arranging the function as a function having a smooth differential coefficient.

Japanese Unexamined Patent Publication No. 3-222577 describes this point in details.

In the image processing apparatus 10 shown in FIG. 13, although $f_{key}$ is fundamentally added to $f_{auto}$, the image processing apparatus 10 is arranged such that the compression ratios of the respective regions can be set only by $f_{key}$ when necessary without carrying out the automatic setting-up (by canceling $f_{auto}$).

As described above, as to cases where a film image serving as an original image is over-exposed or under-exposed, when the film image is under-exposed, the inclination of the gradation curve at a dark portion is increased, whereas when it is over-exposed, the inclination of the gradation curve at a bright portion is increased, to correct the above states. That is, when an image is under-exposed or over-exposed, a dynamic range expansion table (hereinafter, referred to as an expansion table) as shown below is set depending upon a result of discrimination and a dynamic range is expanded on the contrary.

A method of discriminating whether an image is under-exposed or over-exposed is not particularly limited but any known method of discriminating it from a characteristic amount of image, an average image density, a maximum image density, minimum image density or the like may be used.

The setup section 44 stores a basic table $q_{under}$ for correcting under-exposure as shown in FIG. 22(a) and a basic table $q_{over}$ for correcting over-exposure as shown in FIG. 22(b). An expansion table for correcting under-exposure is set by $A \times q_{under}$ and an expansion table for correcting over-exposure is set by $A \times q_{over}$, respectively.

That is, an expansion rate $q_{auto}$ in the automatic setup is determined by the following formula.

$$q_{auto} = A \times q_{under} + B \times q_{over}$$

In the above formula, the coefficients A and B are set within the ranges of $0 \leq A \leq 1$, $0 \leq B \leq 1$ and they are suitably determined in accordance with a discriminated state of a film image, specifically, in accordance with a difference between the minimum density of an image density histogram and a film base image density, frequencies of a bright portion and a dark portion, an amount of image characteristics, an average image density and the like to thereby set the expansion tables for correcting under-exposure and over-exposure.

As shown in FIG. 22(a), the basic table $q_{under}$ of the expansion table for correcting under-exposure is an increasing function having an output which is located below (minus side) the abscissa on the dark portion side from a reference point $Y_0$ determined likewise the aforesaid compression table. The output of the function is minimized at the darkest portion and gradually increases toward a bright portion. Note, the output of the function on the bright portion side from the reference point $Y_0$ is 0.

As shown in FIG. 22(b), the basic table $q_{over}$ of the expansion table for correcting over-exposure is an increasing function having an output which is located above (plus side) the abscissa on the bright portion side from a reference point $Y_0$ which is similar to the above one. The output of the function gradually increases toward a bright portion from the reference point $Y_0$. Note, the output of the function on the dark portion side from the reference point $Y_0$ is 0.

An example of a method of determining the coefficients A and B is such that a table showing the coefficients A and B with respect to a difference between the minimum density ($D_{min}$) of an image density histogram and a film base image density is created as shown in, for example, FIG. 23, and the coefficients A and B are determined using the table.

The basic tables of the above expansion tables and the table shown in FIG. 23 are set such that output image information (film image) is fundamentally located within the reproducible area of a finished print.

Likewise the aforesaid compression table, the expansion ratio can be adjusted through key operation or the like. For example, the expansion ratio is adjusted by changing the coefficients A and B by the depression of, for example, the bright portion adjustment key (α light) and the dark portion adjustment key (α dark) of the compression adjustment key 50.

The expansion ratio set by the automatic setup can be reduced by the adjustment.

As image information to be processed by the expansion table, although unsharp image information created by the LPF 76 (LPF 58) may be processed likewise the aforesaid dynamic range compression, the expansion table does not basically process the image information created by the LPF 76 (LPF 58) but processes luminance image information created by the second MTX 74 (second MTX 56).

That is, the present invention adjusts the dynamic range by applying a frequency component constituting an image in accordance with a state of a film image. As described above, the compression of the dynamic range is applied only to a low frequency component having passed through the LPF 76 (LPF 58) to compress it, whereas the expansion of the dynamic range is fundamentally applied to all the frequency component to expand it. Further, the expansion of the dynamic range is applied only to the low frequency component having passed through the LPF 76 (LPF 58), when necessary, in accordance with the use and the like of a finished print.

When an original image is an under-exposed or over-exposed image, it is necessary to increase a contrast by expanding the dynamic range and increasing the inclination of a gradation curve. However, the reduction of the contrast often depends upon the characteristics of a film serving as an original image. As a result, it is preferable to increase the contrast over the entire frequency component of an image from the low frequency component to the high frequency component thereof. That is, it is preferable to expand the dynamic range in correspondence to the entire frequency component. When the original image is under-exposed or over-exposed in the apparatus shown in FIG. 13, the contrast is ordinarily increased over the entire frequency component in such a manner that the luminance image information created by the second MTX 74 (second MTX 56) is processed by the expansion table of the third LUT 78 (third LUT 60) and main image information is processed using the luminance image information.

On the other hand, in cases where the original image is under-exposed or over-exposed, when unsharp image information is created and processed by the expansion table and main image information is processed using the resultant unsharp image information, the image is made as if so-called soft focusing is applied thereto. Thus, coarseness disappears from the image although sharpness is slightly lowered.

Therefore, when an original image is under-exposed or over-exposed, whether unsharp image information is used or luminance image information is used may be suitably determined depending upon the use and the like of a finished print.

Although the entire frequency component is expanded by directly connecting the second MTX 74 (second MTX 56) to the third LUT 78 (third LUT 60) through a bypass in the apparatus shown in FIG. 13, a method of expanding the entire frequency component in the present invention is not limited thereto. For example, the dynamic range may be expanded by setting an expansion table to the first MTX 72 (first MTX 54) and processing created main image information by the expansion table. Otherwise, similar processing may be carried out by an expansion table set to the fourth LUT 80 (fourth LUT 62).

When the luminance image information created by the second MTX 74 (second MTX 56) is used, since a Y component is used, there is a tendency that a saturation is not changed or lowered, whereas when the dynamic range of main image information created by the first MTX 72 (first MTX 54) or the like, since it is processed in the red, green and blue regions, there is a tendency that the saturation is increased.

Any of the arrangements can be preferably used and they may be suitably selected in accordance with, for example, the characteristics of a film mainly read out by the reading apparatus 22, the characteristics of a photosensitive material mainly used by the recording apparatus 24, and the like.

The unsharp image information or the luminance image information processed by the third LUT 78 as described above is supplied to the adder 82 (adder 66) and added (subtracted) to the main image information processed by the first MTX 72 and directly supplied to the adder 82 as described above. With this operation, a similar effect as that obtained by carrying out the dodging technique using areal exposure can be obtained by compressing the dynamic range of main image information. Otherwise, under-exposure or over-exposure is corrected by expanding the dynamic range of the main image information.

More specifically, the unsharp image information processed by the compression table is arranged as image information having a bright portion set to minus and a dark portion set to plus. Therefore, the addition (subtraction) of the unsharp image information to the main image information processed by first MTX 72 (first MTX 54) permits the bright portion of the main image information is reduced and the dark portion thereof is raised. That is, the dynamic range of the image information is compressed.

The luminance image information (unsharp image information) processed by the under-exposure correcting expansion table shown in FIG. 22(a) is arranged as image information having a dark portion set to minus and a portion on a bright portion side from the reference point set to 0. Thus, the addition (subtraction) of the luminance (unsharp) image information to the main image information permits the dark portion of the main image information to decrease and expand and the inclination of the gradation curve of the dark portion to increase.

The luminance image information (unsharp image information) processed by the over-exposure correcting expansion table shown in FIG. 22(b) is arranged as image information having a bright portion set to minus and a portion on a dark portion side from the reference point set to 0. Thus, the addition (subtraction) of the luminance (unsharp) image information to the main image information permits the bright portion of the main image information to be raised and expand and the inclination of the gradation curve of the bright portion to increase.

In any of the above cases, since the bright portion and the dark portion are compressed or expanded with the reference point $Y_0$ fixed, the gradation (image density) is not greatly changed at the portion having an intermediate image density.

The image information thus obtained by the addition carried out by the adder 82 (adder 66) is supplied to the fourth LUT 80 (fourth LUT 62) as described above and converted into output image information in accordance with the characteristics of a final output medium. That is, the fourth LUT 62 converts the gradation of prescanned image information so that the prescanning image information is made to image information suitable to the display on the monitor 20 and the fourth LUT 80 converts the gradation of the finely scanned image information so that the finely scanned image information is made to image information suitable to the color development of a photosensitive material Z, respectively.

The number of bits is an important element for determining the resolution of gradation of an image in the above various kinds of image processing and if the resolution of gradation is low, a false contour is generated.

Although calculation may be carried out with 8 bits in all the processing in the image processing apparatus 10 of the present invention, when, for example, conversion for increasing the inclination of a gradation curve is carried out at the fourth LUT 80 (fourth LUT 62), there may be caused cases where the one digit of the output from the third LUT 78 (third LUT 60) is expanded and a false contour is recognized in an output image. Accordingly, the generation of the false contour can be prevented by setting the output from the third LUT 78 (third LUT 60) to 10 bits or higher in such a manner that the output from the third LUT 78 (third LUT 60) is set to 10 bits and the signals transferred from the first MTX 72 (first MTX 54) to the adder 82 (adder 66) are converted into 10 bits.

The prescanned image information thus obtained from the fourth LUT 62 is transferred to the signal converter 64 and converted into signals suitable to the monitor 20 and further subjected to D/A conversion by being transferred to a D/A converter 86 and displayed on the monitor 20, as described above.

Since the image displayed on the monitor 20 and the image of a finished print which supplied to the recording apparatus 24 and reproduced thereon have been subjected to the various types of the image processing and the dodging technique in the same manner, the image displayed on the monitor 20 is the same as that of the finished print.

The operator carries out testing while viewing the image displayed on the monitor 20 and can adjust the image recorded on the finished print by adjusting entire density, cyan (C) density, magenta (M) density, yellow (Y) density, gradation, bright portion and dark portion, when necessary through the depression of the respective keys of the adjustment key 50. The adjustment of the dark portion and the bright portion is carried out by adjusting the compression ratio (expansion ratio) of the bright portion and the dark portion of the compression (expansion) table, and the like as described above.

Data which is input by the operator through the adjustment key 50 is supplied to the key correcting section 46 and used as an amount of correction of image processing conditions. The condition setting section 21 combines the amount of correction with the image processing conditions set up by the setup section 44 to thereby set up new image processing conditions after the correction made through the data input. That is, the correction tables of the second LUT 70 (second LUT 52), the compression (expansion) tables of the third LUT 78 (60) and the gradation conversion tables of the fourth LUT 80 (the fourth LUT 62) are adjusted or set again in response to the data input through the adjustment key 50 and the image displayed on the monitor 20 is also changed accordingly.

The finely scanned image information, which has been processed at the fourth LUT 80 of the fine scan image processing section 18 and arranged as image information suitable to the image recorded on the finished print, is supplied to the driver 88 of the recording apparatus 24 as output image information.

Although the image processing apparatus according to the fourth embodiment of the present invention is fundamentally arranged as described above, how the apparatus operates will be briefly described below.

After the digital photo printer shown in FIG. 13 is set up, prescanning is carried out at the reading apparatus 22 likewise the third embodiment shown in FIG. 10, the red, green and the blue images of the image recorded on the film A are read out by switching a color filter plate 30 and stored in red, green and blue prescan memories 12, respectively.

On the completion of the prescanning, the reading apparatus 22 starts fine scanning and the red, green and blue images of the image recorded to the film A are sequentially read out at a high resolution by switching the color filter plate 30 and stored in frame memories of a fine scan memory 14 to which the images of the respective colors correspond, respectively.

The setup section 44 of the condition setting section 21 reads out the prescanned image information from the prescan memory 12 at the time the prescanning is finished and carried out the creation of an image density histogram, the calculation of a maximum image density and a minimum image density, and the like. When, for example, the dodging is carried out, the setup section 44 sets image processing conditions by creating the gray balance adjustment tables, the brightness adjustment tables and the gradation adjustment tables of the second LUTs 70 and 52, the compression tables of the third LUTs 78 and 60, and the gradation conversion tables of the fourth LUT 80 and 62 and outputs the image processing conditions to the parameter combining section 48.

The parameter combining section 48 transfers the thus supplied image processing conditions to the above respective LUTs of the display image processing section 16 and the fine scan image processing section 18 and sets them as image processing tables.

When the image processing conditions are set, the second LUT 52 of the display image processing section 16 reads out the prescanned image information from the prescan memory 12, subjects the image information to various kinds of processing carried out by the thus set respective tables and thereafter the colors of the image information are corrected at the first MTX 54. The image information processed at the first MTX 54 is supplied to the adder 66 and the second MTX 56.

The second MTX 56 creates the luminance image information of the image read-out from the image information supplied thereto, the luminance image information is converted into unsharp image information at the LPF 58 and further processed by the compression table at the third LUT 60 and supplied to the adder 66 as the unsharp image information used to the dodging.

The adder 66 adds (subtracts) the main image information processed at the first MTX 54 to the unsharp image information and the dynamic range of the main image information is compressed to thereby create image information which will be displayed on the monitor 20.

The gradation of the image information output from the adder 66 is converted so that the image information is arranged as an image suitably displayed on the monitor 20. Then, the image information is converted into signals corresponding to a display on the monitor 20 by the signal converter 64 and further converted into analog signals by the D/A converter 86 and displayed on the monitor 20.

The operator carries out testing while viewing the image displayed on the monitor 20 and further carries out various kinds of adjustment through the adjustment key 50, when necessary. When data is input through the adjustment key 50, the key correcting section 46 calculates an amount correction of the image processing conditions and the parameter combining section 48 combines the amount of correction with the image processing conditions set up by the setup section 44. As a result, the image processing conditions are set again or changed and the tables set to the respective LUTs of the display image processing section 16 and the fine scan image processing section 18 are changed accordingly and the image on the monitor 20 is changed.

When the operator determines that the image is proper (testing: OK), an output command is issued and the second LUT 70 of the fine scan image processing section 18 reads out the finely scanned image information from the fine scan memory 14.

Thereafter, the respective tables set to the second LUT 70 adjust the gray balance of the finely scanned image information and corrects the brightness and the gradation thereof likewise the aforesaid prescanned image information.

The image information processed at the first MTX 54 is supplied to the adder 82 and the second MTX 74.

The second MTX 74 creates luminance image information from the image information supplied thereto, the luminance image information is converted into unsharp image information by the LPF 76 and further processed by the compression table of the third LUT 78 and supplied to the adder 82 as the unsharp image information used to the dodging.

The adder 82 adds (subtracts) main image information processed by the first MTX 72 to the unsharp image information and the dynamic range of the main image information is compressed and further the gradation thereof is converted by the fourth LUT 80. Then, the main image information is supplied to the driver 88 of the recording apparatus 24 as output image information corresponding to a recorded image.

Note, the above testing is not always necessary. For example, a print may be created without testing by setting a full automatic mode or the like. In this case, for example, the setup section 44 sets the image processing conditions and the second LUT 70 starts to read out the finely scanned image information and carries out image processing to it at the time the parameter combining section 48 sets the image processing conditions to the respective LUTs.

On receiving the output image information, the recording apparatus 24 outputs a finished print P after it is exposed, developed and dried likewise the third embodiment.

As described above in detail, according to the image processing method of the present invention and the image processing apparatus of the present invention embodying the method, when photoelectrically read-out image information is subjected to image processing and arranged as output image information for recording an image, a state of an original image can be discriminated and the image information can be subjected to dynamic range compression processing or dynamic range expansion processing which is suitable to the discriminated state. Thus, a properly finished print, in which an image having a good image quality has been reproduced, can be stably obtained as image information to which a dodging effect is applied and whose underexposure or over-exposure is preferably corrected.

Although the image processing apparatus and method of the present invention have been described above in details, it is needless to say that the present invention is not limited to the above embodiments and various modifications and changes may be made therein in a scope which does not depart from the gist of the present invention.

What is claimed is:

1. An image processing method, wherein a visible image is reproduced from digital image signals representing a photographic image, the image processing method comprising:
   i) preparing a plurality of kinds of low-pass filters, each of which creates an unsharp image having a different mask size from the digital image signals, wherein the mask size of the unsharp image created by each of the plurality of kinds of low-pass filters is set such that a diameter of a half value width of the mask size on a film become a size proportional to a film size;
   ii) selecting a low-pass filter having a mask size corresponding to pixel density of an image to be reproduced from said plurality of types of the low-pass filters;
   iii) creating unsharp image signals representing the unsharp image of the photographic image using said selected low-pass filter;
   iv) obtaining difference signals by carrying out subtraction between signals relating to pixels which correspond to the digital image signals and the unsharp image signals;
   v) setting processing conditions for compressing or expanding a low image density portion and/or a high image density portion of said image without changing an intermediate density portion of said image; and
   vi) obtaining processed image signals for reproducing the visible image by subjecting the difference signals to predetermined image processing.

2. An image processing method according to claim 1, wherein a low-pass filter, which is suitable depending upon the size of a print to be reproduced, is selected from said plurality of kinds of the low-pass filters having a different mask size.

3. An image processing method according to claim 1, wherein a low-pass filter, which is suitable depending upon the size of a print to be reproduced and whether an image to be reproduced is used for the display on a monitor or not, is selected from said plurality of kinds of the low-pass filters having a different mask size.

4. The image processing method as claimed in claim 1, wherein said diameter of the half value width of the mask size on the film is set Within 0.3–3 mm.

5. The image processing method as claimed in claim 1, wherein said diameter of the half value width of the mask size on the film is set within 0.2–2 mm.

6. An image processing apparatus, wherein a visible image is reproduced from digital image signals representing a photographic image, the image processing apparatus comprising:

i) a plurality of kinds of low-pass filters, each of which creates an unsharp image having a different mask size from the digital image signals, wherein the mask size of the unsharp image created by each of the plurality of kinds of low-pass filters is set such that a diameter of a half value width of the mask size on a film become a size proportional to a film size;

ii) low-pass filter selector for selecting a low-pass filter having a mask size corresponding to pixel density of an image to be reproduced from said plurality of types of the low-pass filters;

iii) unsharp image signal creator for creating unsharp image signals representing the unsharp image of the photographic image using said selected low-pass filter;

iv) subtractor for obtaining difference signals by carrying out subtraction between signals relating to pixels which correspond to the digital image signals and the unsharp image signals;

v) image processor adapted to obtain processed image signals for reproducing the visible image by subjecting the difference signals to predetermined image processing and set processing conditions for compressing or expanding a low image density portion and/or a high image density portion of said image without changing an intermediate density portion of said image.

7. An image processing apparatus according to claim 6, wherein a low-pass filter selector selects a low-pass filter which is suitable depending upon the size of a print to be reproduced.

8. An image processing apparatus according to claim 6, wherein a low-pass filter selector selects a low-pass filter which is suitable depending upon the size of a print to be reproduced and whether an image to be reproduced is an image used for the display on a monitor or not.

9. The image processing apparatus as claimed in claim 6, wherein said diameter of the half value width of the mask size on the film is set Within 0.3–3 mm.

10. The image processing apparatus as claimed in claim 6, wherein said diameter of the half value width of the mask size on the film is set within 0.2–2 mm.

11. An image processing method of subjecting input image information photoelectrically read out by an image reading apparatus to image processing and arranging the input image information as output image information used to record an image, wherein image processing conditions for obtaining output image information are set from prescanned image information having a resolution which is lower than that of the input Image information as well as the prescanned image information is processed in accordance with the thus set image processing conditions and displayed on a monitor, the image processing conditions are adjusted by testing the image displayed on the monitor when necessary, and output image information is obtained by subjecting the input image information to image processing in accordance with the thus set or adjusted image processing conditions, the method comprising:

i) creating unsharp image information which is formed by making an image carried by the input image information unsharp, when necessary, and applying a dodging effect to thus obtained output image information by processing the input image information with the unsharp image information, wherein the processing includes applying unsharp image information to color signals of the input image information; and ii) subjecting, when the dodging effect is applied to the output image information, the prescanned image information to processing similar to that applied to the input image information for the application of the dodging effect thereto and displaying the prescanned image information to which the dodging effect is applied on the monitor, wherein said processing changes a low image density portion of said image and/or a high image density portion of said image without changing an intermediate portion of said image.

12. An image processing method according to claim 11, wherein the frequency characteristics of the unsharp image information are set at a ratio in accordance with the ratio between the resolution of the input image information and the resolution of the prescanned image information to process the input image information and the prescanning image information.

13. An image processing method according to claim 11, wherein the unsharp image information for processing the prescanned image information is created using an infinite impulse response type filter.

14. An image processing method according to claim 11, further comprising a memory for storing the unsharp image information for processing the thus created prescanned image information and when the image processing conditions are adjusted by said adjustment means, the unsharp image information is read out from said memory and the prescanning image information is processed with the unsharp image information.

15. An image processing apparatus for subjecting input image information photoelectrically read out by an image reading apparatus to image processing and arranging the input image information as output image information used to record an image, comprising:

i) setting device adapted to set image processing conditions, wherein the setting device applies unsharp luminance information to color signals of input image information, for obtaining output image information from prescanned image information having a resolution which is lower than that of the input image information and said image processing conditions allow changing a low image density position of said image and/or a high image density portion of said image without changing an intermediate portion of said image;

ii) adjustment device adapted to adjust the image processing conditions set by said selling device;

iii) display image processor adapted to subject the prescanned image information to predetermined image processing in accordance with the image processing conditions set by said setting device and further adjusted by said adjustment device, when necessary, to arrange the prescanned image information as display image information;

iv) a monitor for displaying the image information processed by said display image processor thereon; and v) output image processing device adapted to subject the input image information to image processing in accordance with the image processing conditions which are set by said setting device and further adjusted by said adjustment device and creating unsharp image information which is formed by making an image carried by the input image information unsharp, when necessary, and processing the input image information with the unsharp image information to thereby apply a dodging effect to thus obtained output image information and arranging the input image information as output image information, wherein said display image processor comprises dodging effect applicator for subjecting, when the dodging effect is applied to the output image information, the prescanned image information to processing similar to that applied to the input image information for the application of the dodging effect thereto and arranging the prescanned image information as display image information to which the dodging effect is applied.

16. An image processing apparatus according to claim 15, wherein the frequency characteristics of the unsharp image information are set at a ratio in accordance with the ratio between the resolution of the input image information and the resolution of the prescanned image information to process the input image information and the prescanning image information.

17. An image processing apparatus according to claim 15, wherein the unsharp image information for processing the prescanned image information is created using an infinite impulse response type filter.

18. An image processing apparatus according to claim 15, further comprising a memory for storing the unsharp image information for processing the thus created prescanned image information and when the image processing conditions are adjusted by said adjustment means, the unsharp image information is read out from said memory and the prescanning image information is processed with the unsharp image information.

19. An image processing method of subjecting image information photoelectrically read out by an image reading apparatus to image processing and arranging the image information as output image information used to record an image, comprising:
  determining image density characteristics from the image information;
  applying luminance information derived from the image information to color signals of the image information to generate a second image information;
  setting processing conditions using the second image information for independently and non-linearly compressing or expanding the low image density portion and/or the high image density portion of the image, respectively without changing the intermediate image density portion of the image in accordance with the image information and the determined image density characteristics; and
  creating output image information by carrying out image processing in accordance with the processing conditions.

20. An image processing method according to claim 19, wherein the processing conditions are set such that the output image information is located within a predetermined image reproducible region in accordance with the dynamic range of the image information.

21. An image processing method according to claim 19, wherein when it is discriminated that the image information has a high frequency at a bright portion as the result of discrimination of the state of the image, the processing conditions are set such that a dark portion is strongly compressed, whereas when it is discriminated that the image information has a high frequency at the dark portion, the processing conditions are set such that the bright portion is strongly compressed.

22. An image processing method according to claim 19, wherein when an image information source is a negative film and the negative film serving as an original image is an under-exposed negative film or an over-exposed negative film, the processing conditions are set such that the bright portion and/or the dark portion of the image is independently and non-linearly expanded, respectively.

23. An image processing apparatus for subjecting image information photoelectrically read out by an image reading apparatus to image processing and arranging the image information as output image information used to record an image, comprising:
  determination device adapted to determine image density characteristics from the image information;
  setting device adapted to set processing conditions, wherein luminance information derived from the image information is applied to color signals of the image information under which the dark portion and/or the bright portion of the image is independently and non-linearly compressed or expanded, respectively without changing the intermediate image density portion of the image from the image information and the result of determination; and
  processing device adapted to carry out processing in accordance with the processing conditions set by said setting device to thereby obtain output image information.

24. An image processing apparatus according to claim 23, wherein the processing conditions are set such that the output image information is located within a predetermined image reproducible region in accordance with the dynamic range of the image information.

25. An image processing apparatus according to claim 23, wherein when it is discriminated that the image information has a high frequency at a bright portion as the result of discrimination of the state of the image, the processing conditions are set such that a dark portion is strongly compressed, whereas when it is discriminated that the image information has a high frequency at the dark portion, the processing conditions are set such that the bright portion is strongly compressed.

26. An image processing apparatus according to claim 23, wherein when an image information source is a negative film and the negative film serving as an original image is an under-exposed negative film or an over-exposed negative film, the processing conditions are set such that the bright portion and/or the dark portion of the image is independently and non-linearly expanded, respectively.

27. An image processing method comprising:
  determining image density characteristics from image information;
  processing said image information and generating a first digital image signal and a second digital image signal wherein each of said signals are color signals;
  generating unsharp image signals from said second digital image signal;
  applying said unsharp digital image signal to each of the color signals of the first digital image signal to setting processing conditions for independently and non-linearly compressing or expanding a low image density portion and/or a high image density portion of said image, respectively, without changing an intermediate image density portion of the image in accordance with said image information and said image density characteristics; and
  creating output image information by carrying out image processing in accordance with said processing conditions.

28. An image processing apparatus for subjecting image information photoelectrically read out by an image reading apparatus to image processing and arranging the image information as output image information used to record an image, comprising:

a first matrix processor that uses said image information and generates a first digital image signal and a second digital image signal wherein each of said signals are color signals;

a second matrix processor adapted to transform said second digital image signal into a luminance signal;

an unsharp image signal processor which transforms said luminance signal into an unsharp image signal; and a setting device adapted to utilize said unsharp image signal and said first digital image signal, wherein the unsharp image signal is applied to the color signals of the first digital image signal to setting processing conditions so a dark portion and/or a bright portion of said image is independently and non-linearly compressed or expanded, respectively without changing an intermediate image density portion of said image from said image information.

29. An image processor for processing a digital image signal representative of an image comprising:

a first matrix adapted to receive the digital image signal and generate a first signal and a second signal;

a first processor adapted to process said second signal and generate an unsharp image signal; and a second processor adapted to utilize said first signal and said unsharp image signal, wherein the unsharp image signal is applied to color signals of the first signal to set processing conditions so areas of low image density and/or high image density may be independently and non-linearly compressed or expanded, respectively without changing an intermediate image density of the image.

30. The image processor according to claim 29, wherein said first processor comprises:

a second matrix adapted to change said second signal into a luminance signal; and an unsharp image processor adapted to generate an unsharp image signal from said luminance signal.

31. An image processing method for subjecting image information photoelectrically read out by an image reading apparatus to image processing and arranging the image information as output image information used to record an image, comprising:

generating a digital image signal from said image information;

obtaining a low-frequency image signal using said generated digital image signal;

subjecting said low-frequency image signal to dynamic range adjustment processing;

obtaining a difference signal by subtracting said subjected low-frequency image signal subjected to dynamic range adjustment processing from said generated digital image signal; and obtaining a processed image signal by subjecting said difference signal to predetermined image processing.

32. An image processing apparatus for subjecting image information photoelectrically read out by an image reading apparatus to image processing and arranging the image information as output image information used to record an image, comprising:

a converter for generating a digital image signal from said image information;

a low-pass filter for obtaining a low-frequency image signal from said digital image signal;

a dynamic range adjustment device for subjecting said low-frequency image signal to dynamic range adjustment;

a subtractor for obtaining a difference signal by carrying out subtraction between said generated digital image signal and said subjected low-frequency image signal from said dynamic range adjustment device; and a processor for obtaining a processed image signal by subjecting said difference signal to predetermined image processing.

33. The image processing method according to claim 31, wherein said dynamic range adjustment processing includes processing said low-frequency image signal according to a dynamic range adjustment curve, and wherein said dynamic range adjustment curve is arranged such that an output of a pivot point of the curve is set as zero.

34. The image processing method according to claim 33, wherein said dynamic range adjustment curve is arranged such that an output of said curve corresponding to bright portions of the image is negative, and an output of said curve corresponding to dark portions of the image is positive.

35. The image processing apparatus according to claim 32, wherein said dynamic range adjustment processor includes a dynamic range adjustment curve for processing said low-frequency image signal, and wherein said dynamic range adjustment curve is arranged such that an output of a pivot point of the curve is set as zero.

36. The image processing method according to claim 35, wherein said dynamic range adjustment curve is arranged such that an output of said curve corresponding to bright portions of the image is negative, and an output of said curve corresponding to dark portions of the image is positive.

* * * * *

UNITED STATES PATENT AND TRADEMARK OFFICE
CERTIFICATE OF CORRECTION

PATENT NO. : 6,674,544 B2
DATED : January 6, 2004
INVENTOR(S) : Kazuo Shiota, Toru Matama and Hiroshi Yamaguchi It is certified that error appears in the above-identified patent and that said Letters Patent is hereby corrected as shown below:

Column 40,
Line 60, claim 4 should read:
4. The image processing method as claimed in claim 1, wherein said diameter of the half value width of the mask size on the film is set within 0.3-3 mm.

Column 41,
Line 37, claim 9 should read:
9. The image processing apparatus as claimed in claim 6, wherein said diameter of the half value width of the mask size on the film is set within 0.3-3 mm.

Line 48, claim 11 should read:
11. An image processing method of subjecting input image information photo electrically read out by an image reading apparatus to image processing and arranging the input image information as output image information used to record an image, wherein image processing conditions for obtaining output image information are set from prescanned image information having a resolution which is lower than that of the input image information as well as the prescanned image information is processed in accordance with the thus set image processing conditions and displayed on a monitor, the image processing conditions are adjusted by testing the image displayed on the monitor when necessary, and output image information is obtained by subjecting the input image information to image processing in accordance with the thus set or adjusted image processing conditions, the method comprising:

i) creating unsharp image information which is formed by making an image carried by the input image information unsharp, when necessary, and applying a dodging effect to thus obtained output image information by processing the input image information with the unsharp image information, wherein the processing includes applying unsharp image information to color signals of the input image information; and ii) subjecting, when the dodging effect is applied to the output image information, the prescanned image information to processing similar to that applied to the input image information for the application of the dodging effect thereto and displaying the pre scanned image information to which the dodging effect is applied on the monitor, wherein said processing changes a low image density portion of said image and/or a high image density portion of said image without changing an intermediate portion of said image.

UNITED STATES PATENT AND TRADEMARK OFFICE
CERTIFICATE OF CORRECTION

| | |
|---|---|
| PATENT NO. | : 6,674,544 B2 |
| DATED | : January 6, 2004 |
| INVENTOR(S) | : Kazoo Shiota, Toru Matama and Hiroshi Yamaguchi |

It is certified that error appears in the above-identified patent and that said Letters Patent is hereby corrected as shown below:

<u>Column 42,</u>
Line 45, claim 15 should read:
15. An image processing apparatus for subjecting input image information photo electrically read out by an image reading apparatus to image processing and arranging the input image information as output image information used to record an image, comprising:

i) setting device adapted to set image processing conditions, wherein the setting device applies unsharp luminance information to color signals of input image information, for obtaining output image information from prescanned image information having a resolution which is lower than that of the input image information and said image processing conditions allow changing a low image density position of said image and/or a high image density portion of said image without changing an intermediate portion of said image;

ii) adjustment device adapted to adjust the image processing conditions set by said setting device;

iii) display image processor adapted to subject the prescanned image information to pre-determined image processing in accordance with the image processing conditions set by said setting device and further adjusted by said adjustment device, when necessary, to arrange the prescanned image information as display image information;

iv) a monitor for displaying the image information processed by said display image processor thereon; and v) output image processing device adapted to subject the input image information to image processing in accordance with the image processing conditions which are set by said setting device and further adjusted by said adjustment device and creating unsharp image information which is formed by making an image carried by the input image information unsharp, when necessary, and processing the input image information with the unsharp image information to thereby apply a dodging effect to thus obtained output image information and arranging the input image information as output image information, wherein said display image processor comprises dodging effect applicator for subjecting, when the dodging effect is applied to the output image information, the prescanned image information to processing similar to that applied to the input image information for the application of the dodging effect thereto and arranging the prescanned image information as display image information to which the dodging effect is applied.

UNITED STATES PATENT AND TRADEMARK OFFICE
CERTIFICATE OF CORRECTION

PATENT NO.    : 6,674,544 B2
DATED         : January 6, 2004
INVENTOR(S)   : Kazoo Shiota, Toru Matama and Hiroshi Yamaguchi It is certified that error appears in the above-identified patent and that said Letters Patent is hereby corrected as shown below:

Column 43,
Lines 56-60, claim 21 should read:
21. An image processing method according to claim 19, wherein when it is determined that the image information has a high frequency at a bright portion as the result of determination of the image density characteristics, the processing conditions are set such that a dark portion is strongly compressed, whereas when it is determined that the image information has a high frequency at the dark portion, the processing conditions are set such that the bright portion is strongly compressed.

Column 44,
Lines 30-34, claim 25 should read:
25. An image processing apparatus according to claim 23, wherein when it is determined that the image information has a high frequency at a bright portion as the result of determination of the image density characteristics, the processing conditions are set such that a dark portion is strongly compressed, whereas when it is determined that the image information has a high frequency at the dark portion, the processing conditions are set such that the bright portion is strongly compressed.

Signed and Sealed this

Fourteenth Day of December, 2004

JON W. DUDAS
*Director of the United States Patent and Trademark Office*